under_ US006061439A

United States Patent [19]
Bleile et al.

[11] Patent Number: 6,061,439
[45] Date of Patent: May 9, 2000

[54] METHOD AND APPARATUS FOR PROVIDING SUBSCRIBER SERVICES TO A TELEPHONE

[75] Inventors: Leonard George Bleile; Anthony Hamilton Smith, both of Calgary, Canada

[73] Assignee: Nortel Networks Corporation, Montreal, Canada

[21] Appl. No.: 08/826,171

[22] Filed: Mar. 27, 1997

[51] Int. Cl.[7] .................................................. H04M 3/42
[52] U.S. Cl. .......................................... 379/201; 379/157
[58] Field of Search .................................. 379/201, 211, 379/212, 215, 157

[56] References Cited

U.S. PATENT DOCUMENTS

| | | | |
|---|---|---|---|
| 5,181,238 | 1/1993 | Medamana et al. | 379/95 |
| 5,369,696 | 11/1994 | Krauss et al. | 379/268 |
| 5,425,097 | 6/1995 | Pula | 379/396 |
| 5,485,511 | 1/1996 | Iglehart et al. | 379/201 |
| 5,615,257 | 3/1997 | Pezzullo et al. | 379/396 |
| 5,619,562 | 4/1997 | Sattar et al. | 379/201 |
| 5,644,631 | 7/1997 | Maurer et al. | 379/21 |

FOREIGN PATENT DOCUMENTS

| | | | |
|---|---|---|---|
| 0 325 327 A1 | 7/1989 | European Pat. Off. | H04Q 3/62 |
| 0 451 693 A2 | 10/1991 | European Pat. Off. | H04M 3/42 |
| 0 687 094 A2 | 12/1995 | European Pat. Off. | H04M 3/42 |
| 0 706 278 A2 | 4/1996 | European Pat. Off. | H04M 3/42 |
| 44 34 082 A 1 | 3/1996 | Germany . | |
| 195 23 537 A 1 | 1/1997 | Germany . | |

OTHER PUBLICATIONS

International Application Published Under the Patent Cooperation Treaty (PCT), Publication Number WO 96/25012, Publication Date Aug. 15, 1996. PCT International Application Serial No. PCT/GB96/00252 filed Feb. 7, 1996. Title: Information Services Provision and Management. Applicant: British Telecommunications Public Limited Company.

*Primary Examiner*—Creighton Smith
*Attorney, Agent, or Firm*—Kevin L. Smith

[57] ABSTRACT

A method and apparatus for obtaining subscriber services available from a service provider, in a telephone in communication with the service provider. The method includes the step of receiving a subscriber services message at the telephone, where the subscriber services message includes a feature identifier for identifying at least one of a plurality of features available in the telephone and a feature controller for controlling whether or not the feature is to be enabled at the telephone. The method further includes the steps of displaying at the telephone a display message including an indication of features enabled at the telephone and transmitting to the service provider a feature request code associated with an enabled feature selected by a user of the telephone, the subscriber services request identifying to the service provider a request for the enabled feature selected by the user. The enabled feature is then provided to the telephone by the central office.

77 Claims, 16 Drawing Sheets

EEPROM Record Format

| List Position | | | | | | |
|---|---|---|---|---|---|---|
| zero | Message | | | | | |
| | 0x12 bytes (NULL) | | | | | |
| | NULL | 0 | 0 | 0 | 1 | |
| one | Call Return | | | | | |
| | *69 | | | | | |
| | NULL | 0 | 0 | 0 | 0 | |
| two | Repeat Dial | | | | | |
| | *66 | | | | | |
| | NULL | 0 | 0 | 0 | 0 | |
| three | Call Forward | | | | | |
| | *72 | | | | | |
| | NULL | 0 | 1 | 0 | 0 | |
| four | Call Fwd V.Mail | | | | | |
| | *72P | | | | | |
| | NULL | 0 | 1 | 0 | 0 | |
| five | Cancel Call Fwd | | | | | |
| | *73 | | | | | |
| | NULL | 1 | 0 | 0 | 0 | |
| six | Block Caller ID | | | | | |
| | *67 | | | | | |
| | NULL | 0 | 0 | 0 | 0 | |
| seven | Cancel Call Wtg | | | | | |
| | *70 | | | | | |
| | NULL | 0 | 0 | 1 | 0 | |
| eight | | | | | | Empty for user's use |
| | NULL | | | | | |
| nine | | | | | | |
| | NULL | | | | | |

Reference numbers: 91, 88, 93, 95, 97, 99, 101, 103, 105, 107, 109

Fig. 5

Power Up / Idle

Power Up Algorithm

Fig.9

CAS ACK — 300

| Msg Type | Field | | DSCWID | CCF | Prompt |
|---|---|---|---|---|---|
| | ANSI Feature Download | —302 | 85 | 85 | 85 |
| | Msg Length | —304 | mlen | mlen | mlen |
| | Msg Number | —306 | 1 | 1 | 1 |
| 1st Parm type | Download Connect | —314 | 83 | 83 | 83 |
| | 1st Parm Length | —316 | plen | plen | plen |
| | Name of Service 1-16 bytes (ASCII) | —318 | "Downloading" | "Downloading" | "Downloading" |
| | delimiter | | XX | XX | XX |
| 308 | Feature Description Number 4 bytes<br><br>n=1 for DSCWID<br>n=2 for CCF<br>n=3 prompt<br>n=4 telco message<br>etc... | —322 | 1 | 2 | 3 |
| | Security Code 4 bytes (telco Specific) | —324 | XX | XX | XX |
| | Version Number | —326 | XX<br>XX | XX<br>XX | XX<br>XX |
| 2nd Parm type | Load CPE Script Soft Key Parameter Code | —328 | 80 | 80 | 80 |
| | 2nd Parameter Length | —330 | plen | plen | plen |
| | Definer | —332 | one | two | one |
| 310 | Full Label 1-18 bytes | —334 | Pls Hold/Hold | Repeat Dial | Welcome to |
| | delimiter | —336 | XX | XX | XX |
| | delimiter | | XX | XX | XX |
| | Soft Key Return String 0-28 bytes | —340 | 6 | *66 | XX |
| 3rd Parm type | Load Script | —342 | 82 | 82 | 82 |
| | 3rd Parameter Length | —344 | plen | plen | plen |
| | Extend ability | —348 | XX | XX | XX |
| 312 | Instruction Code | —350 | XX | XX | XX |
| | Parameters<br><br>2 bytes/DSCWID<br>1 byte/CCF | —352 | 96<br>15 | X0<br>XX | XX<br>XX |
| 4th Parm type | Code | | 82 | 82 | 82 |
| 313 | Delemiter | | XX | XX | XX |
| | Download Disconnect | | XX | XX | XX |
| | 4th Parameter Length | | XX | XX | XX |
| | CHECKSUM | —354 | cs | cs | cs |

METHOD AND APPARATUS FOR PROVIDING SUBSCRIBER SERVICES TO A TELEPHONE

BACKGROUND OF THE INVENTION

This invention relates to telephones operable to be configured remotely, perhaps by a central office, or an another telephone in communication with the telephone to provide subscriber features.

Various telephone companies are providing features such as Caller Identification on Call Waiting with Disposition (DSCWID) and Custom Calling Features (CCF) to residential telephone subscribers. To take advantage of such services, residential customers must purchase specialized equipment capable of handling the features offered by the telephone company. Furthermore, generally once such services are requested, they are kept active on the telephone permanently. There is no convenient way to dynamically change the complement of features available to the subscriber.

Some manufacturers have allowed for dynamic requests of telephone company services by providing a menu of services available, using an Analogue Display Services Interface (ADSI) communications protocol. Telephones which support the full ADSI protocol, however, tend to be expensive, as the ADSI protocol is intended to provide other features such as graphics based displays and the like. Another manufacturer provides a product which has a plurality of buttons, associated with all possible DSCWID options. With this product, it is inevitable that a user would be faced with having many keys which will be meaningless and which may have names unrecognizable to the user, unless the specific functions associated with the keys have been subscribed to by the user and have been explained to the user.

What would be desirable, therefore, is a way of permitting a telephone set equipped with an FSK receiver such as used for calling line ID reception to be programmed to enable certain features already programmed into the telephone to be used by a customer. This would allow telephone companies to provide dynamic customer access to DSCWID features, custom calling features, customized power-up prompts, display advertising, current telephone bill information, telephone company messages and the like. Individual customers may download only the features they have paid for, in whatever language they want, as many times as they want. This has advantages in that it reduces service calls provided by the telephone company, allows the customer easy access to revenue generating network features of the telephone company, allows the telephone company to brand line their products in whatever manner and in whatever language they wish and also permits the telephone company to provide promotions such as one month of free features to give users an opportunity to test certain features. In addition, the ability to read the status of a telephone from a remote location and use messaging to reprogram a telephone to effect a repair or to add features would be desirable. In addition, as telephone are used for services which require a certain degree of privacy, such as personal banking, it would be desirable to be able to blank out confidential sequences of keypad entries to prevent onlookers from determining passwords, bank account numbers and the like. The present invention addresses these needs.

BRIEF SUMMARY OF THE INVENTION

In accordance with one aspect of the invention, there is provided a method of obtaining subscriber services available from a service provider, in a telephone in communication with the service provider. The method includes the steps of: a) receiving a subscriber services message at the telephone, where the subscriber services message includes a feature identifier for identifying at least one of a plurality of features available in the telephone and a feature controller for controlling whether or not the feature is to be enabled at the telephone, b) displaying at the telephone a display message including an indication of features enabled at the telephone and c) transmitting to the service provider a feature request code associated with an enabled feature selected by a user of the telephone, the feature request code identifying to the service provider a request for the enabled feature selected by the user, and d) providing the enabled feature to the telephone.

In accordance with another aspect of the invention, there is provided a method of enabling features available from a service provider, in a telephone in communication with the service provider. The method includes the steps of receiving a subscriber services message at the telephone, the subscriber services message including a feature identifier for identifying at least one of a plurality of features available in the telephone and a feature controller for controlling whether the feature is to be enabled at the telephone, and displaying at the telephone a display message including an indication of features enabled at the telephone.

In accordance with another aspect of the invention, there is provided a method of requesting features available from a service provider, for use in a telephone in communication with the service provider. The method includes the steps listed immediately above and further includes the step of transmitting to the service provider a feature indicator associated with an enabled feature selected by a user of the telephone, the feature indicator identifying to the service provider a request for the enabled feature selected by the user.

The method may include the step of pre-programming the telephone with the plurality of features.

The step of receiving preferably includes the steps of receiving a feature identification code and receiving a feature control code. Preferably, the step of receiving includes the step of storing the feature control code.

In addition, the method preferably includes the steps of displaying a respective indication for each enabled feature at the telephone and successively displaying a respective indication of each enabled feature.

Preferably, the step of receiving includes the steps of receiving and storing a name of a feature to be enabled at the telephone.

The method may include the step of associating with at least one of the enabled features an indication of a related enabled feature and displaying an indication of the related enabled feature after displaying at least one of the enabled features.

Preferably, the step of receiving includes the step of receiving a list position code and the method includes the step of displaying indications of the enabled feature in an order determined by the list position code.

Preferably, the method includes the steps of receiving from a user an indication of a selected feature and responding to the indication of a selected feature, by locating in memory a feature identification code corresponding to the selected feature and transmitting when a corresponding feature control code is active.

Preferably, the method includes the step of copying the feature identification code and its associated feature control code and its associated feature indicator to a feature buffer.

Preferably, the step of receiving includes the steps of receiving and storing a feature name of a feature to be enabled at the telephone and locating th(e feature name in memory and copying the feature name to the feature buffer.

In addition, the method preferably includes the steps of locating in memory an indication of a related enabled feature and copying the indication of a related enable feature to the feature buffer.

Preferably, the method includes the step of detecting when power is applied to the telephone after having no power supplied, and displaying at said telephone a power up prompt.

Preferably, the method includes the step of retrieving the power-up prompt from non-volatile memory.

Preferably, the method includes the step of detecting whether or not a handset of the telephone is connected to a base of the telephone and displaying an idle prompt when the handset is connected to the base.

Preferably, the step of receiving includes the step of receiving the idle prompt.

Preferably, the method includes the step of receiving and displaying a sequence of user input data to be transmitted from the telephone to the service provider.

Preferably, the method includes the step of protecting the sequence of user input data from display by: a) comparing an initial portion of the sequence of user input data with a reference sequence, b) if the initial portion is not equal to the reference sequence, copying the initial portion to a display buffer, c) if the initial portion and the reference sequence are equal and a control code associated with the reference sequence is active, copying no subsequent portion of the sequence of user input data to the display buffer, d) if the initial portion and the reference sequence are not equal or the control code associated with the reference sequence is not active, copying the subsequent portion to the display buffer, and e) displaying the contents of the display buffer.

Preferably, the method includes the step of producing the sequence of user input data in response to user input and pre-programming the reference sequence into a reference sequence buffer.

Preferably, the method includes the steps of producing the sequence of user input data in response to user input and accumulating the sequence of user input data as the sequence of user input data is entered by the user to produce the initial portion of the sequence of user input data.

In accordance with another aspect of the invention, there is provided an apparatus for requesting features available from a service provider, in a telephone in communication with the service provider. The apparatus includes: a) a receiver for receiving a subscriber services message at the telephone, the subscriber services message containing a feature identifier for identifying at least one of a plurality of features available in the telephone and a feature controller for controlling whether or not the feature is to be enabled at the telephone, b) a display for displaying at the telephone a display message including an indication of features enabled at the telephone, and c) a transmitter for transmitting to the Service provider a feature indicator associated with an enabled feature selected by a user of the telephone, the feature indicator identifying to the service provider a request for the enabled feature selected by the user.

Preferably, the apparatus includes memory operable to be pre-programmed with the plurality of features.

Preferably, the receiver is operable to receive a feature identification code and a feature control code. Preferably, the receiver is operable to receive the feature control code and preferably, the memory is operable to store the feature control code.

Preferably, the display is operable to display a respective indication for each enabled feature at the telephone and to successively display a respective indication of each enabled feature.

Preferably, the receiver is operable to receive a name of a feature to be enabled at the telephone and preferably, the memory is operable to store the name of the feature.

Preferably, the apparatus includes a microprocessor is operable to direct the display to display respective names of enabled features and preferably, the microprocessor is operable to direct the display to successively display respective names of the enabled features.

Preferably, the microprocessor is operable to associate with at least one of the enabled features an indication of a related enabled feature and preferably, the microprocessor is operable to direct the display to display an indication of the related enable feature after displaying at least one of the enabled features.

Preferably, the receiver is operable to receive a list position code associated with a feature.

The apparatus may include a processor programmed to display indications of enabled features in an order determined by the list position code.

Preferably, the microprocessor is programmed to receive from a user an indication of a selected feature and to respond to the indication of the selected feature, by locating in memory a feature identification code corresponding to the selected feature and transmitting when a corresponding feature control code is active.

Preferably, the microprocessor is programmed to direct the display to render active an indicator associated with the selected feature.

Preferably, the apparatus includes a feature buffer and preferably, the microprocessor is programmed to copy the feature identification code, its associated feature control code and its associated feature indicator to the feature buffer.

Preferably, the receiver is operable to receive a feature name of a feature to be enabled at the telephone.

In addition, the microprocessor is programmed to locate in memory a feature name of a feature to be enabled at the telephone and to copy a feature name to the feature buffer.

Preferably, the microprocessor is programmed to detect when power is applied to the telephone after having no power supplied, and to direct the display to display a power up prompt.

Preferably, the apparatus includes non-volatile memory and preferably, the microprocessor is programmed to retrieve the power-up prompt from the non-volatile memory.

Preferably, the apparatus includes a detector for detecting whether or not a handset of the telephone is connected to a base of the telephone and if so, provide an idle signal to the microprocessor. Preferably, the microprocessor is programmed to direct the display to display an idle prompt in response to the idle signal.

Preferably, the receiver is operable to receive the idle prompt and the microprocessor is programmed to store the idle prompt.

Preferably, the apparatus includes a user input device for receiving and displaying a sequence of user input data to be transmitted from the telephone to the service provider. The user input device may include a keypad for producing the sequence of user input data in response to user input.

The apparatus may further include a display buffer and a microprocessor, the microprocessor being programmed to protect the sequence of user input data from display by: a) comparing an initial portion of the sequence of user input data with a reference sequence; b) if the initial portion is not equal to the reference sequence, copying the initial portion to the display buffer; c) if the initial portion and the reference sequence are equal and a control code associated with the reference sequence is active, copying no subsequent portion of the sequence of user input data to the display buffer, d) if the initial portion and the reference sequence are not equal or the control code associated with the reference sequence is not active, copying the subsequent portion to the display buffer, and e) directing the display to display the contents of the display buffer.

Preferably, the apparatus includes a reference sequence buffer and preferably, the microprocessor is programmed to preprogram the reference sequence into the reference sequence buffer.

Preferably, the apparatus includes an accumulator for accumulating the sequence of user input data as the sequence of user input data is entered by the user to produce the initial portion of the sequence of user input data.

BRIEF DESCRIPTION OF THE SEVERAL VIEWS OF THE DRAWING

In drawings which illustrate embodiments of the invention,

FIG. 5 is a listing of all feature records in the CCF group of features according to the first embodiment of the invention;

FIG. 9 is a representation of a subscriber services message format depicting a message format of messages received at the telephone from the central office, according to the: first embodiment of the invention;

DETAILED DESCRIPTION OF THE INVENTION

FIG. 1

Figure 1:
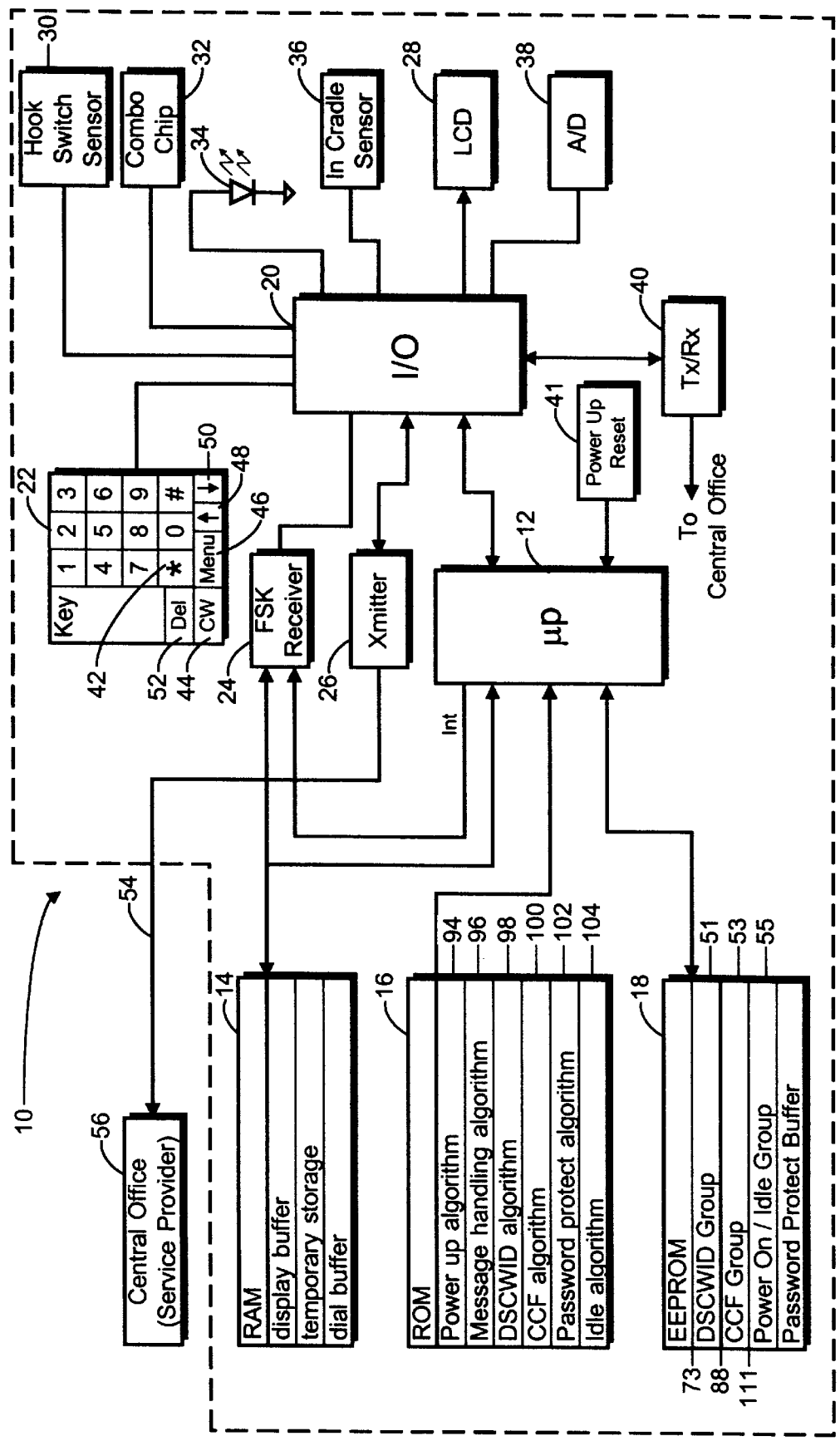
FIG. 1 is a block diagram of a telephone apparatus according to a first embodiment of the invention.

Referring to FIG. 1, a cordless telephone apparatus according to a first embodiment of the invention is shown generally at 10. The apparatus includes a microprocessor 12 and memory including Random Access Memory (RAM) 14, Read Only Memory (ROM) 16 and Electrically Erasable Programmable Read Only Memory (EEPROM) 18, in communication with the microprocessor.

The apparatus further includes an Input/Output (I/O) port 20 also in communication with the microprocessor. To the I/O port are connected a keypad 22, a Frequency Shift Key (FSK) receiver 24, a message transmitter 26, a Liquid Crystal Display (LCD) 28, a hook switch sensor 30, a combo chip 32, an LED 34, an in-cradle sensor 3E, an analogue to digital converter 38, a conventional telephone audio transmitter and receiver 40 and a conventional power-up reset circuit 41.

The keypad 22 includes a conventional telephone dial pad having a star (*) key 42, a call-waiting (CW) key 44, a menu key 46, up and down keys 48 and 50 and a delete key 52. The call-waiting key may alternatively be a "flash" or "link" key. The keypad 22 generates keypad signals in response to keypresses and the keypad signals are supplied to the I/O port 20 for communication to the microprocessor 12.

The FSK receiver 24 is in communication with a conventional tip and ring loop 54 provided by a central office which supplies telephone services to the telephone. The central office therefore acts as a service provider 56 while the telephone 10 acts as subscriber equipment operable to receive telephone services from the central office. The FSK receiver 24 can receive and decode subscriber services messages from the central office and provide such messages in a digital format to the microprocessor 12, through the I/O port 20. The FSK receiver thus acts as a receiver for receiving a subscriber services message at the telephone.

The transmitter 26 is also in communication with the central office 56 and is operable to transmit to the central office, using Dual Tone Multi-Frequency DTMF signals, in response to signals presented to it by the microprocessor 12 through the I/O port 20.

The hook switch sensor 30 is conventional and provides an off-hook signal to the I/O port 20 to indicate whether or not the telephone handset is on or off hook. While lifting the handset from the cradle normally places the telephone in the off-hook state, the telephone may also be placed in the off-hook state by the microprocessor. In any event, no matter how the telephone is placed in the off-hook state, the hook switch sensor renders the off-hook signal active when the telephone is in the off-hook state.

The combo chip 32 is an integrated circuit which formats and receives messages for radio communications in the cordless telephone. This chip has registers which are readable and writable by the microprocessor to determine and effect certain functionality.

The LED 34 is connected to the I/O port 20 such that the microprocessor 12 can write to the I/O port to turn the LED 34 on or off. The LED is used to provide a bright visual indication of a pending service or feature at the telephone.

The in-cradle sensor 36, includes a sensing circuit for measuring current to a rechargeable handset of the telephone. The in-cradle sensor 36 provides a signal to the I/O port 20, readable by the microprocessor 12 indicating whether or not the handset is in or out of the cradle. The in-cradle sensor acts as a detector for detecting whether or not a handset of the telephone is connected to a base of the telephone and if so, provides an idle signal to the microprocessor.

The liquid crystal display (LCD) 28 is conventional and includes a two and one-half line display glass operable to display two lines of 16 characters each, and time and date icons. The LCD 28 receives signals from the microprocessor 12 through the I/O port 20. The microprocessor 12 defines a display buffer in RAM 14 and stores characters intended to be displayed on the LCD in the display buffer. A separate routine (not shown) running in the microprocessor 12 simply retrieves characters from the display buffer and passes them to the LCD through the I/O port 20 for display.

The analogue to digital converter 38 has control registers (not shown) which can be read from and written to by the microprocessor 12 through the I/O port 20.

The conventional telephone voice transmitter and receiver 40 is connected to loop 54 to receive and transmit signals to and from the central office 56.

The power-up reset circuit 41 is conventional and provides a signal to the microprocessor when power is applied to the microprocessor circuit.

The EEPROM 18 is pre-programmed at the time of manufacturing the telephone, with a plurality of features. In this embodiment, the features may be categorized into three groups including a Call Waiting Display with Disposition (DSCWID) group 51, a Custom Calling Features (CCF) group 53, and a power-up/idle group 55.

DSCWID Group of Features

The DSCWID group of features includes a plurality of groups of memory locations for holding DSCWID feature records. In this embodiment, there are eight feature records in eight respective positions in memory. The records are associated with the following features: switch/answer, Plshold/hold, Join/conference, Take Msg/forward, Hangup/drop, announcement, drop 1st/first, drop 2nd/last. Each record has fields organized in a DSCWID record format as shown at 60 in FIG. 2.

FIG. 2

Figures 2, 3:
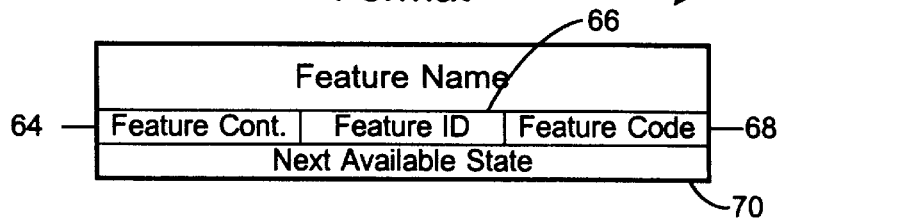
FIG. 2 is a Call Waiting Display with Disposition (DSCWID) feature record format according to the first embodiment of the invention.
FIG. 3 is a listing of feature records for all features in the DSCWID group according to the first embodiment of the invention.

Referring to FIG. 2, the DSCWID record format includes a sixteen-byte feature name field 62, a one-bit feature controller field 64 for storing a feature controller code, three-bit feature identification field 56 for storing a feature identification code, a four-bit feature code field 68 for storing a feature request code, and an eight-bit next available state field 70 for storing a next available state code. The contents of the feature name field are an ASCII string defining a character to be displayed on the LCD shown in FIG. 1. The feature controller code is for indicating whether or not the associated feature is enabled or not. The feature ID field code identifies the feature associated with the feature name. The feature code is a code transmitted by the transmitter in FIG. 1, to the central office to request the central office to provide a subscriber service associated with the feature name. The compatible features code identifies the position of a compatible feature in the DSCWID group which can be used with the feature named.

FIG. 3

Referring to FIG. 3, the contents of all eight DSCWID records are shown generally at 72. The entire group is located in memory starting at a DSCWID group base address 73 and each record is located in a respective record position zero through seven. Each record position begins at a respective record base address 73, 75, 77, 79, 81, 83, 85, 87.

In the records shown in FIG. 3, all features are enabled except drop first/first and drop secc,nd/last. This is indicated by the feature controller codes in the feature controller fields 64. Each enabled feature has a code bit equal to 1 to indicate the feature is enabled. The drop first/first and drop second/last records in positions six and seven each have a 0 in the feature controller field 64 and therefore are not enabled.

The feature ID field 66 of each record has a unique code to identify it from other features. In this embodiment, the feature ID codes range from 000 to 111.

The feature code field 68 of each record also contains a unique code which is operable to be transmitted back to the central office to request the central office services required to effect the feature.

The next available state field 70 is an eight-bit field having bit positions 0–7. Each bit position corresponds to a respective record position in the group such that an active bit (ie. "1") in a particular bit position identifies the position of a record of a related feature which may be used in conjunction with the current record. Thus for example, the record in position zero has active bits in the zeroth, second and fourth bit positions of the next available state field, which indicates that the features associated with the records in positions zero (switch/answer (ie. the current record)), two (join/conference) and four (hangup/drop) are features which may be used in conjunction with the zeroth record.

CCF Group of Features

Referring back to FIG. 1, the CCF group of features 53 includes a plurality of groups of memory locations for holding CCF feature records beginning at a fixed base address 88. The records are associated with the following features: Message, Call Return, Repeat Dial, Call Forward, Call FWD V. Mail, Cancel Call Fwd, Block Caller ID, and Cancel Call Waiting.

Figure 4:
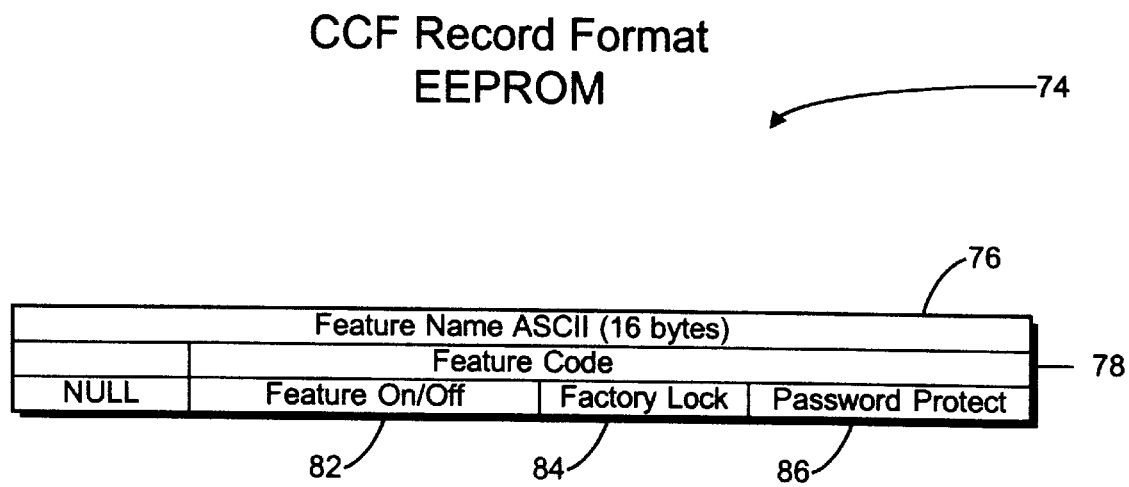
FIG. 4 is a representation of a Custom Calling Feature (CCF) record format according to the first embodiment of the invention.

Each CCF record has fields organized in a CCF record format as shown at 74 in FIG. 4.

FIG. 4

Referring to FIG. 4, the CCF record format 74 includes a sixteen byte feature name field 76, a twenty-four bit feature code field 78 for storing a feature code, a two-bit feature on/off code field 82 for storing a feature on/off code, a one-bit factory lock code field 84 for storing a factory lock code, and a one-bit password protect code field 86 for storing a password protect code.

Referring to FIGS. 1 and 4, the contents of the feature name field include an ASCII string operable to be displayed on the LCD 28 shown in FIG. 1. The feature code is a code transmitted by the message transmitter 26 in FIG. 1 to the central office to request the central office 56 to provide a subscriber service associated with the feature. The feature on/off code includes two bits which are used to control the LED 34 and LCD to provide a visual indication that the feature is in operation. In this embodiment, when the feature on/off field contains the value 00, the states of the LCD and LED remain unchanged from their present values. If it contains the value 01, the status of LED is to be activated by this feature and the contents of the feature name field are displayed on the LCD. If it contains the value 10, the status of the LED is to be deactivated by this feature and the feature name message is not to be displayed on the LCD. Thus, the LCD acts as a display for displaying at the telephone a display message including an indication of features enabled at the telephone, where the indication includes the feature name.

The factory lock code enables or disables the ability of the user to delete the associated feature from the set of available features. The password project code indicates whether or not a password is required to complete the feature.

FIG. 5

Referring to FIG. 5, the contents of all ten CCF records are shown generally at 91.

The entire group of CCF records is stored in the EEPROM 18 beginning at the CCF base address 88. Each individual record of the CCF group is located in memory at a respective fixed memory address offset from the CCF base address 88. In this embodiment, there are ten feature records in ten respective positions zero through nine at respective CCF record base addresses 88, 93, 95, 97, 99, 101, 103, 105, 107, 109 respectively.

The first eight records are for the Message, Call Return, Repeat Dial, Call Forward, Call FWD V. Mail, Cancel Call Fwd, Block Caller ID, and Cancel Call Waiting features. The remaining two records are left undefined and are available for use by the user.

Power-up/idle Feature

Figure 6:
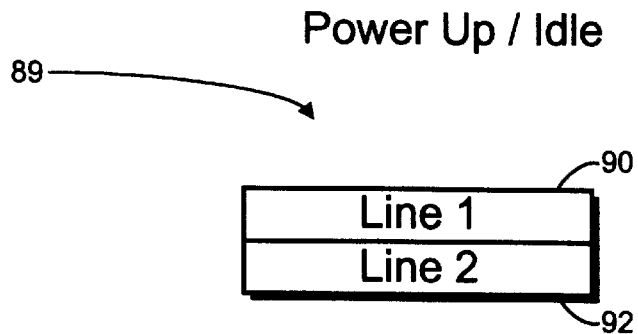
FIG. 6 is a power-up/idle record format according to the first embodiment of the invention.

Referring back to FIG. 1, the power-up/idle group of features includes a single power-up/idle record located at a power-up group base address 111. Referring to FIG. 6, the power-up idle record is shown generally at 89. This record includes first and second sixteen-character fields 90 and 92 for storing ASCII codes for characters to be displayed on the LCD as prompts. Each character field is displayed on a separate, respective line on the LCD.

FIG. 7

Figure 7:
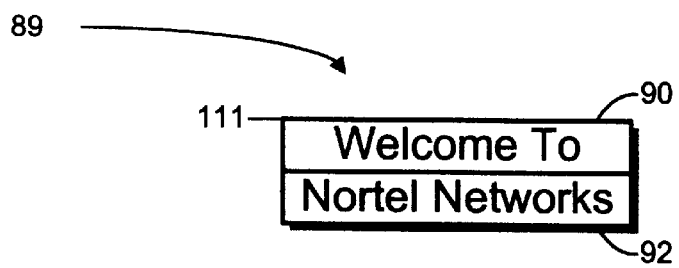
FIG. 7 is a power-up/idle record according to the first embodiment of the invention.

Referring to FIG. 7, in this embodiment, the first field 90 contains the ASCII string "Welcome To" while the second field 92 contains the ASCII string "Nortel Networks". In this embodiment, at power-up, both lines are displayed on the LCD 28 while during idle conditions, only the second line of text is displayed.

Algorithms

Referring back to FIG. 1, the ROM 16 is programmed with blocks of coded instructions operable to direct the microprocessor 12 to perform functional blocks of various algorithms. In this embodiment, there are six main algorithms including a power-up algorithm 94, a message handling algorithm 96, a DSCWID algorithm 98, a CCF algorithm 100, a password protect algorithm 102, and an idle algorithm 104.

Power-up Algorithm

FIG. 8

Referring briefly to FIG. 1, the power-up reset circuit provides a power-up interrupt signal to the microprocessor 12 to invoke a block of code in the ROM which implements the power-up algorithm. Thus, the microprocessor is programmed to detect when power is applied to the telephone, after having no power supplied.

Figure 8:
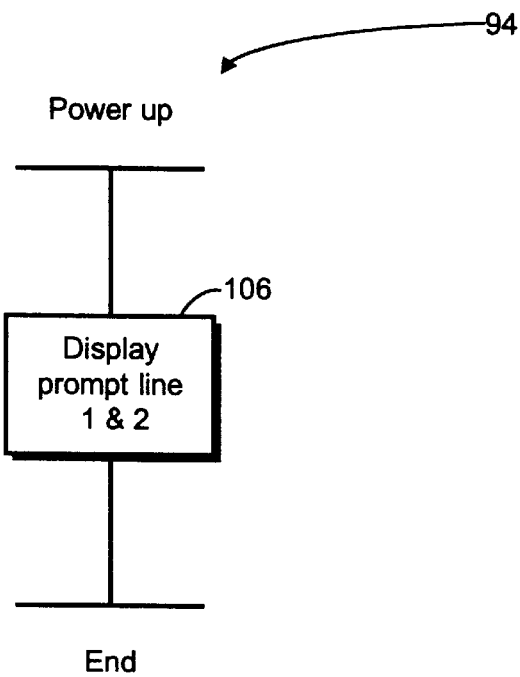
FIG. 8 is a flowchart describing a power-up algorithm according to the first embodiment of the invention.

Referring to FIG. 8, the power-up algorithm is shown generally at 94 and includes block 106. Block 106 directs the microprocessor 12 to the power-up group base address 111 shown in FIG. 1 and copies the contents of the line 1 and line 2 fields 90 and 92 from the EEPROM shown in FIG. 7, to the display buffer in the RAM. The microprocessor 12 then forwards the contents of these fields to the LCD to display the prompt "Welcome to" on the first line of the LCD display and the prompt "Nortel Networks" on the second line of the LCD display. The display as a whole therefore permanently displays the phrase "Welcome to Nortel Networks" until further display characters are written to the display buffer. The microprocessor is thus programmed to retrieve the power-up prompt from the non-volatile memory and cause the power up prompt to be displayed.

Referring back to FIG. 8, upon copying the contents of the power-up idle record to the display buffer, the power-up algorithm is completed.

FIG. 9

Referring to FIGS. 1 and 9, the central office is operable to send to the apparatus a subscriber services message having a format as shown at 300 in FIG. 9. Generally the message format is similar to the conventional Analog Display Services Interface (ADSI) format.

The central office alerts the telephone that a subscriber services message is ready to be sent, by transmitting a Customer Premise Equipment Alerting Signal (CAS) to the telephone. The microprocessor responds by acknowledging the CAS signal with a DTMF "D" to distinguish the capability of the telephone from a full ADSI compliant telephone which would respond with a DTMF "A". The central office then transmits the subscriber services message to the telephone.

The subscriber services message is sent to the apparatus as a frequency shift keyed encoded message which is received at the FSK receiver 24 and provided to the microprocessor 12 through the I/O port 20.

FIG. 9

Referring to FIG. 9, the subscriber services message format is shown generally at 300. In this embodiment, the format includes a message type identifier including an ADSI feature download identifier field 302, which in this embodiment is "85", a message length identifier field 304, a message number field 306, first, second, third and fourth parameter group fields 308, 310, 312, 313 respectively and a checksum field 354.

The first parameter group includes a download connect field 314, which, in this embodiment, includes the value "83", a parameter length field 316, a name of service field 318 a delimiter field 320, a feature description number field 322 where the description number is 1 for DSCWID, 2 for CCF, 3 for prompt, and 4 for a telephone company message. The first parameter group further includes a security code field 324 and a version number field 326.

The second parameter group includes a load CPE SCRIPT Soft Key Parameter Code field 328, a second parameter length field 330, a definer field 332 for holding a list position code, a full label field 334 for holding a feature name, two delimiter fields shown generally at 336 and a soft key return string field 340 for holding a feature code (*68 for example). The receiver is thus operable to receive a list position code, the list position code being the soft key return string in the soft key return string field 340.

The third parameter group includes a load script field 342, a third parameter length field 344, an extend ability field 348, an instruction code field 350, a parameter field 352 for holding feature ID and next available option codes for DSCWID features and feature on/off, password protect and lock codes for CCF features. Thus, the FSK receiver is operable to receive a feature identification code. It will also be appreciated that by receiving and storing the next available option code in the parameter field, the microprocessor is programmed to store, in memory, an indication of a feature related to the record identified by the contents of the feature ID portion of the parameter field 352.

The checksum field holds a checksum value calculated on the basis of the preceding portions of the message.

MESSAGE HANDLING ALGORITHM

FIG. 10

Figure 10:
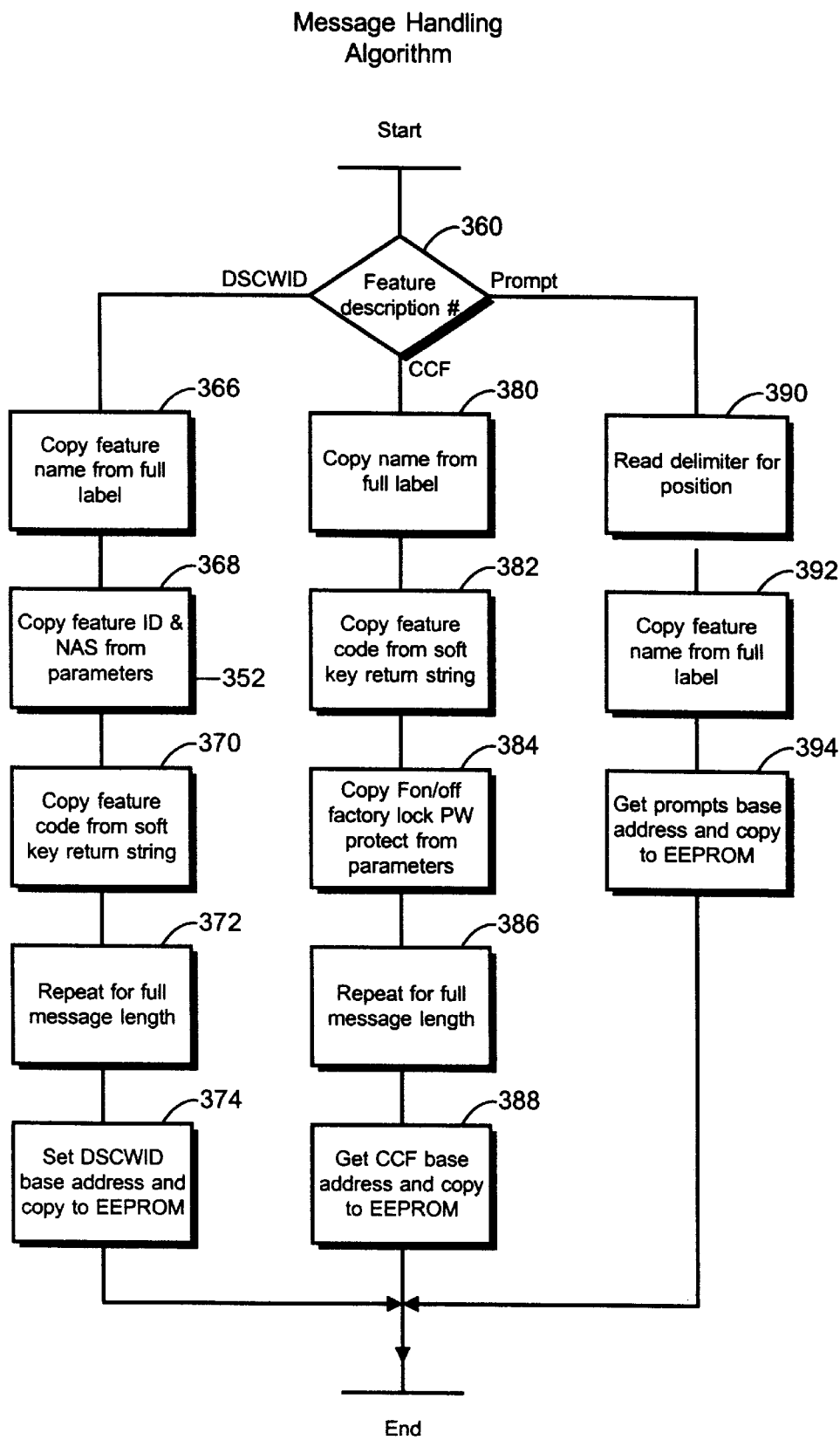
FIG. 10 is a flowchart describing a message handling algorithm according to the first embodiment of the invention.

Referring to FIGS. 10, 2 and 3, the message handling algorithm is implemented by blocks of code which implement functional blocks of the algorithm as shown at 358. The message handling algorithm begins with block 360 which directs the microprocessor to read the feature description number field 322 of the message to determine whether the message relates to DSCWID, CCF or Prompts.

DSCWID Records

If the feature description number is 1, the message relates to DSCWID and block 366 directs the microprocessor to copy the feature name (PlsHold) from the full Label field 334 to the feature name field (62) of a temporary DSCWID record buffer (not shown) in RAM, having a format as shown in FIG. 2. Thus, the FSK receiver is operable to receive a name of a feature to be enabled at the telephone and the microprocessor is operable to store the name of the feature.

Block 368 then directs the microprocessor to copy the contents of the first DSCWID parameter field 352 to the temporary DSCWID record buffer to define the contents of the feature controller bit field 64 (1), feature ID field 66 (001) and next available state field 70 (00010101). The feature ID code acts as a feature identifier for identifying at least one of a plurality of features available in the telephone and the feature control bit field acts as a feature controller for controlling whether or not the feature is to be enabled at the telephone.

Block 370 then directs the microprocessor to copy the contents of the soft key return string field 340 (0110) to the feature code field 68 and the entire record is completed. The FSK receiver is thus operable to receive a feature control code.

Block 372 then directs the microprocessor to build any additional records in the temporary DSCWID buffer using the same format, until all parameters of the message have been handled.

Block 374 then directs the microprocessor to store the temporary DSCWID record (if only one record is to be received) in the DSCWID group of records in the EEPROM at a position defined by the contents of the definer field 10 332. Thus, the EEPROM acts as memory operable to be pre-programmed with a plurality of features defined by feature records. In this embodiment, the record in the temporary DSCWID buffer in RAM is copied to position one beginning at base address 75 in the DSCWID group of records.

CCF Records

If at block 360, the feature description number is 2, the message relates to a CCF message and block 380 directs the microprocessor to copy the feature name (PlsHold) from the full label field 334 to the feature name field (76) of a temporary CCF record buffer in RAM, having a format as shown in FIG. 4. Block 382 then directs the microprocessor to copy the contents of the soft key return string field 340 (*66) to the feature code field 78 of the temporary CCF record.

Block 384 then directs the microprocessor to copy the contents of the parameter field 352 to the temporary record to define the feature on/off codes, the factory lock code and the password protect code (0000). A temporary CCF record is thus created.

Block 386 then directs the microprocessor to build any additional records in the temporary buffer using the same format, until all parameters of the message have been handled.

Block 388 then directs the microprocessor to store the temporary CCF record (if only one record is to be received) in the CCF group of records in the EEPROM at the position defined by the contents of the definer field 332. In this embodiment, the record in the temporary CCF buffer in RAM is copied to position two, beginning at base address 95 in the CCF group of records.

Prompt Records

If at block 360, the feature description number is 3, the message relates to a prompt feature and block 390 directs the microprocessor to store the contents of the full label field 334 in a temporary prompt buffer in RAM to produce a temporary prompt record having a format as shown in FIG. 6. Block 394 then directs the microprocessor to store the contents of the temporary prompt buffer in the prompt group of records at a location in the EEPROM defined by the contents of the definer field 332. In this embodiment, the definer field contains the value 0 and therefore the contents of the temporary prompt buffer (Welcome To) are copied to the first field 90 of the prompt record in EEPROM. The microprocessor is thus programmed to store the idle prompt in non-volatile memory.

The DSCWID, CCF and Prompt groups of records are thus loaded with values contained in the message sent to the telephone by the central office. In this manner features are enabled and disabled at the telephone.

DSCWID Algorithm

FIG. 11

Figure 11:
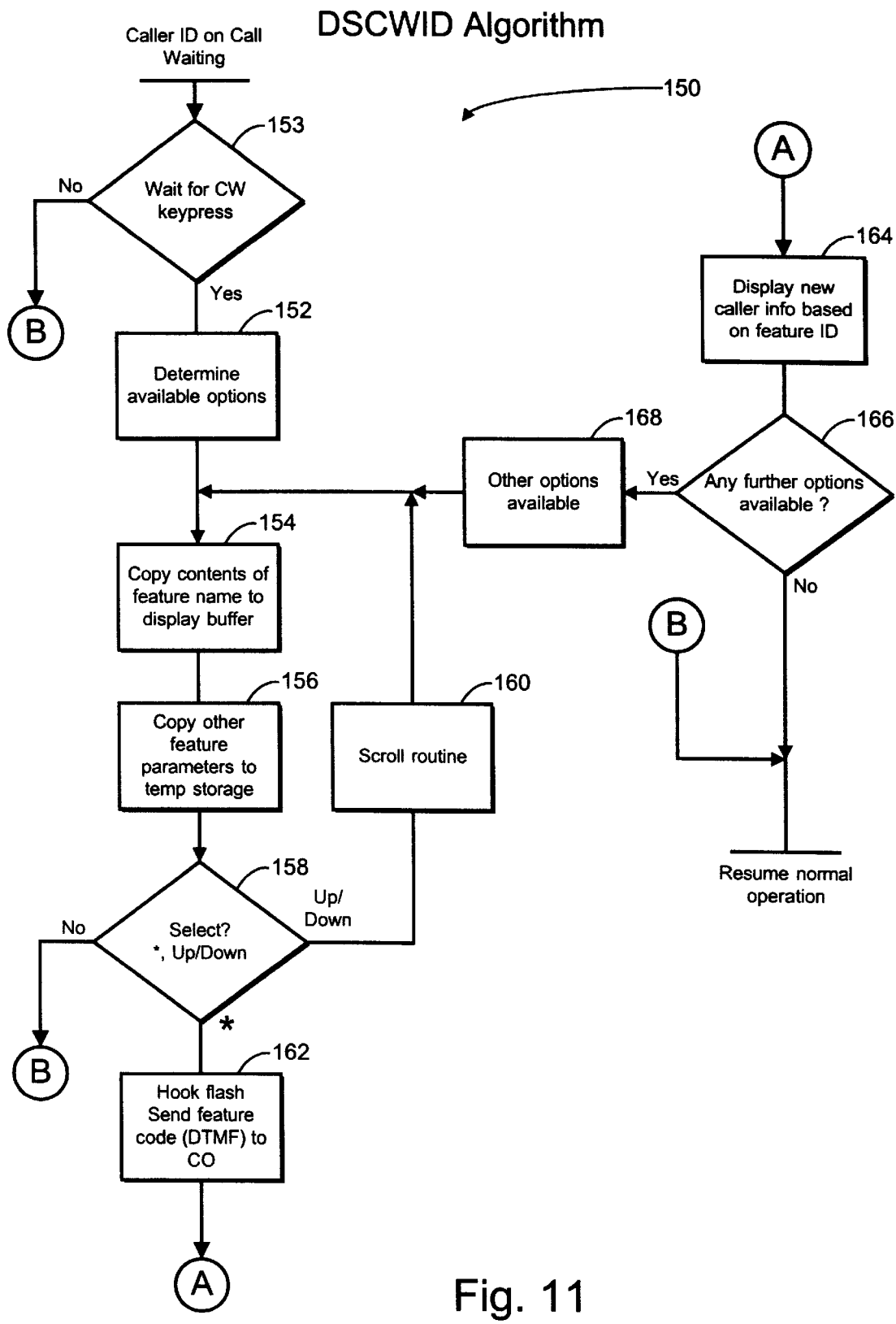
FIG. 11 is a flowchart representing a DSCWID algorithm according to the first embodiment of the invention.

Referring to FIG. 11, a flowchart depicting the DSCWID algorithm is shown generally at 150. Code implementing the DSCWID algorithm is stored in ROM 16 and is invoked upon the user pressing the call-waiting key 44 shown in FIG. 1.

Upon receiving an indication through the I/O port 20 that the CAS tone and FSK caller ID data have been received, the microprocessor 12 is directed to block 1!53 which directs the microprocessor to wait for the user to press the call-waiting key 44 on the keypad 22. If the user does not press the call waiting key, the telephone resumes normal operation, if on the other hand, the user presses the call waiting key, the microprocessor is directed to block 152.

Block 152 then directs the microprocessor to determine the available options. To do this, the code directs the microprocessor 12 to read the feature controller fields 64 of each of the DSCWID records and wherever an active feature controller bit is located, a note of the record position in the DSCWID record group, is stored in RAM.

Block 154 then directs the microprocessor 12 to read the RAM to find a first record in the list and copy the contents of the feature name field 62 to the display buffer in the RAM. Thus, in effect, upon completion of block 154 the feature name is displayed on the LCE).

Block 156 then directs the microprocessor to copy the remaining feature parameters, ie., the contents of the feature controller field 64, the contents of the feature ID field 66, the contents of the feature code field 68 and the contents of the next available state field 70 to a working DSCWID feature buffer in RAM. The microprocessor is thus programmed to copy the feature identification code, its associated feature control code and its associated feature indicator to a feature buffer.

Next, block 158 directs the microprocessor to wait for a keypress from the telephone keypad, in particular, an up/down arrow key 48, 50 or the star key 42. If the user fails to press any of these keys, the microprocessor is directed to resume normal processing. If the up or down arrow keys 48 or 50 are pressed, block 160 directs the microprocessor to call a scroll routine (not shown) which moves forward or backward among the positions of DSCWID records or, in other words, through the features with records stored in positions zero through seven in FIG. 3. The microprocessor is thus operable to direct the display to successively display respective names of the enabled features.

If at block 158, the user presses the star key 42, block 162 directs the microprocessor to read the feature code field 68 of the feature buffer in RAM and transmit it to the central office 56 in a DTMF format. The feature control code thus acts as a feature indicator and the microprocessor directs the transmitter to transmit to the service provider the feature indicator associated with an enabled feature selected by a user of the telephone, the feature indicator identifying to the service provider a request for the enabled feature selected by the user.

In other words, upon pressing the call-waiting key 44, the user is presented with an indication of at least one enabled feature and through the use of the up/down arrow keys 48 and 50, can scroll through a list of available features and can select a currently displayed feature by pressing the star key 42 at which time, the corresponding feature code is sent to the central office 56 to request the central office 56 to provide services cooperating with the selected feature.

After the feature code is sent to the central office, block 164 directs the microprocessor to display new caller information based on the feature ID code. For example assuming the PlsHold/Hold feature is selected, the display buffer would be loaded with a string reflecting name and number information (if known) of the first caller.

Block 166 then directs the microprocessor to read the contents of the next available state field 70 of the record corresponding to the currently selected feature to determine what other features, if any, may be used with the selected feature. If the contents of the next available state byte are non-zero, processing continues with block 168 which directs the microprocessor writs to the display buffer to cause the display to indicate t-o the user that other options are available. Processing then continues at block 154 however, the scroll routine 160 is limited to permit scrolling through only the features which are available options with the currently selected feature. Thus, the microprocessor is programmed to associate with at least one of the enabled features an indication of a related enabled feature.

In this embodiment, referring briefly to FIG. 3, assuming the PlsHold/Hold feature has been selected, the next available state byte contains active bits in positions zero, two and four and therefore, the switch/answer feature, the join/conference feature or the Hang Up/Drop features can be used with the PlsHold/Hold feature. The microprocessor is thus operable to direct the display to display an indication of a related feature after displaying an indication of an enabled feature.

CCF Algorithm
FIG. 12

Figure 12A:
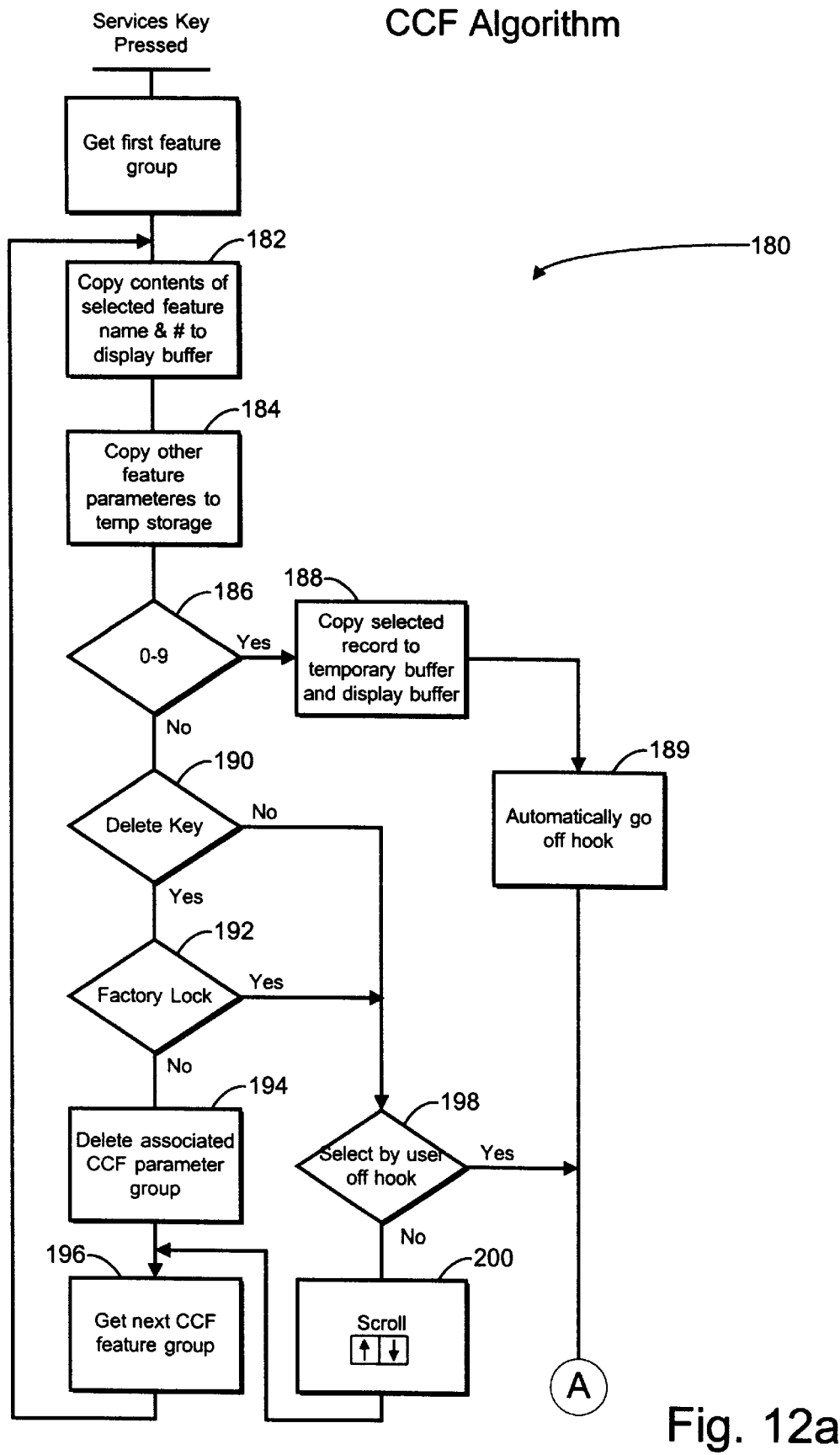
FIG. 12a is a flowchart representing a first portion of a CCF algorithm according to the first embodiment of the invention.
Figure 12B:
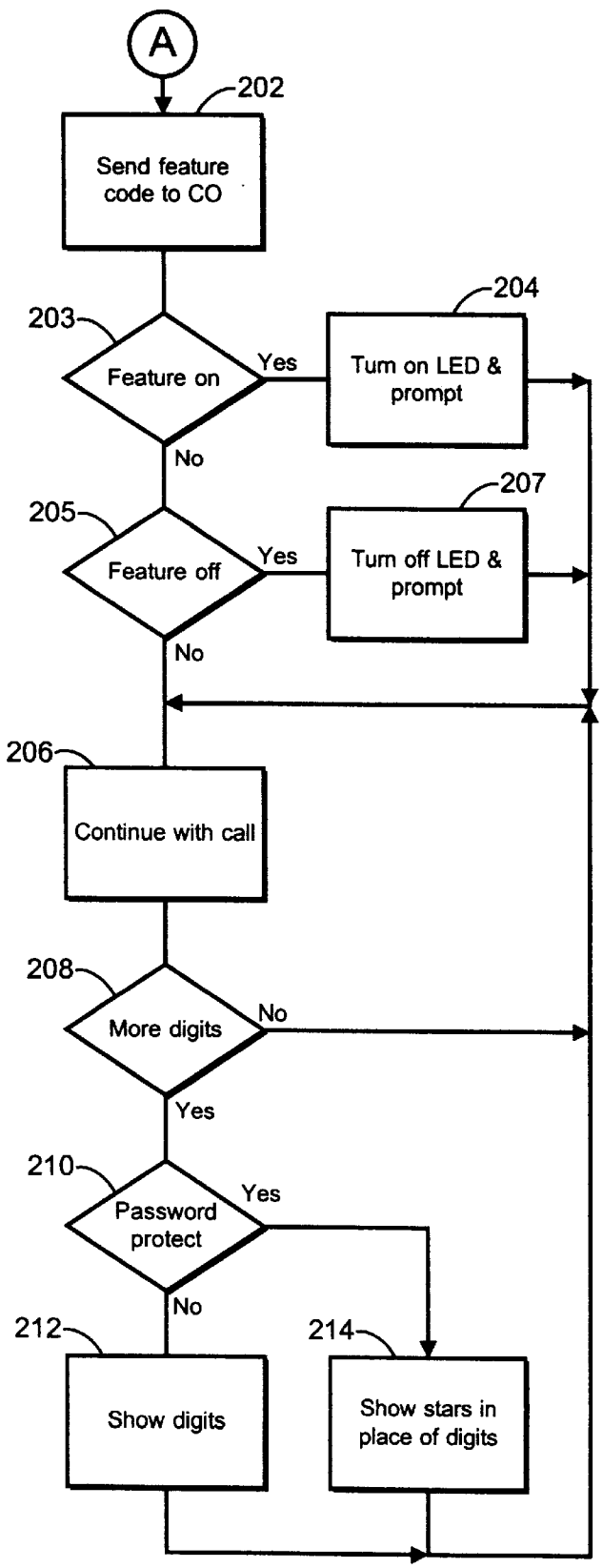
FIG. 12b is a flowchart representing a second portion of a CCF algorithm according to the first embodiment of the invention.
Figure 13:
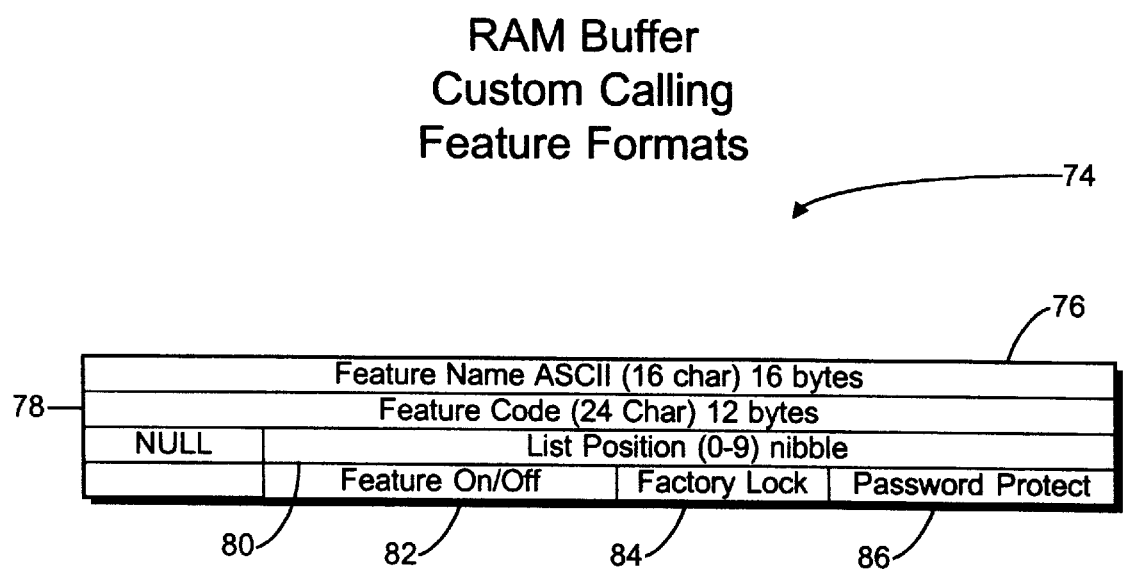
FIG. 13 is a representation of a field format of a temporary working CCF buffer according to the first embodiment of the invention.

Referring to FIGS. 12a and 12b, a flowchart according to the CCF algorithm is shown generally at 180. Code implementing the algorithm is accessed when the menu key 46 is actuated. The first block 181 of the CCF algorithm directs the microprocessor to copy the contents of the record in the zeroth position in the CCI group to a CCF feature buffer to produce a CCF feature working record having a format as shown in FIG. 13. Generally the format of the CCF feature buffer is similar to the record format shown in FIG. 4, with the exception that it further includes a list position nibble field 80 which identifies the position in the CCF group from which the record was copied. Since block 181 results in the contents of the record in the zeroth position to be copied to the CCF feature buffer, the value 0000 to represent the zeroth position is stored in the list position nibble field 80.

Block 182 of the CCF algorithm directs the microprocessor to read the list position nibble field 80 of each record in the CCF group of feature records. It then determines which record has the lowest value and determines the associated record to be the first record to be displayed. Thus, microprocessor is programmed to display indications of the enabled features in an order determined by the list position code of the subscriber services message, the list position code being stored in the list position nibble field 80.

The corresponding feature name is copied from the CCF feature buffer to the display buffer and the LCD displays the name of the first feature. Block 184 then directs the microprocessor to copy the remaining feature parameters, including the feature code, feature on/off, factory lock, and password protect, to the CCF feature buffer in RAM. Block 186 then directs the microprocessor to determine whether any of the 0 to 9 keys on the telephone keypad have been depressed and whether or not the delete key has been depressed. If any of the keys 0 through 9 is depressed, block 188 directs the microprocessor to find the CCF feature record stored in the position identified by the key pressed and to copy the contents of that record to the CCF feature buffer and to copy the contents of the feature name field 76 to the display buffer. Thus, the microprocessor is programmed to receive from a user an indication of a selected feature.

Block 189 then directs the microprocessor to automatically go off-hook and the microprocessor is directed to continue processing at point A in FIG. 12b.

If, rather than a number key, the delete key 52 is pressed, block 190 directs the microprocessor to read the factory lock code field 84 of the record stored in the CCF feature buffer and block 192 directs the microprocessor to determine whether or not the factory lock code is set to yes or no.

If the factory lock code is set to no, block 194 directs the microprocessor to delete the associated CCF record from the display buffer, the CCF feature buffer and the CCF group of records in EEPROM and block 196 directs the microprocessor to locate the next CCF record having the next highest value in the list position nibble field 80. The feature name field 76 of such record is then copied to the display buffer and is displayed on the LCD and the remaining feature parameters are copied to the CCF feature buffer and processing continues at block 182.

If the user presses neither the 0 to 9 keys on the keypad or the delete key, or if the factory lock is set to yes, block 198 directs the microprocessor 12 to wait for the user to lift the handset to take the telephone off-hook to select the current feature corresponding to the record stored in the CCF feature buffer and whose name is displayed on the LCD display. The microprocessor is then directed to continue processing at point A in FIG. 12b. If, instead of taking the telephone off-hook, the user presses the up or down keys, block 200 causes the record with the next highest value in the list position or the next lowest value in the list position, to be retrieved to the CCF feature buffer and processing continues with block 196.

Referring to FIG. 12b, upon completion of the blocks shown in FIG. 12a, processing continues at block 202 in FIG. 12b. Block 202 directs the microprocessor to locate the feature code of the record stored in the CCF feature buffer and to direct the transmitter 26 to send to the central office 56 DTMF tones indicative of the feature code.

Block 203 then directs the microprocessor to read the feature on/off code field 82 to determine whether or not the feature on bit is set. If this bit is set, block 204 then directs the microprocessor write to the I/O port to turn on the LED and to cause a prompt to be displayed on the LCD.

If the feature on bit is not set, block 205 directs the microprocessor to determine whether or not the feature off bit is set. If this bit is set, block 207 directs the microprocessor to write to the I/O port to turn off the LED and to turn off the prompt on the LCD.

If the feature off bit is inactive, or after turning the LED and prompt on or off, block 206 then directs the microprocessor 12 to continue with conventional call processing.

Block 208 directs the microprocessor to monitor the I/O port 20 to determine whether or not more digit keys have been pressed at the keypad 22. If no more digits have been pressed, the microprocessor 12 is directed back to block 206 which directs it to continue with the call. If more digits are pressed, however, block 210 directs the microprocessor to read the password protect code field 86 of the records stored in the temporary storage buffer to determine whether or not the contents of the password protect code field 86 are set active. If the password protect bit is not set, block 212 directs the microprocessor to copy the digits entered by the user to the display buffer.

It will be appreciated that the display buffer has an accumulating-type buffer wherein previously entered codes are shifted left and continue to be displayed while additional codes are entered.

If the password protect bit is set to active, block 214 directs the microprocessor write stars or some other meaningless character to the display buffer instead of sending codes corresponding to the digits entered at block 208 to the display buffer.

Idle Algorithm

FIG. 14

Referring briefly to FIG. 1, when the telephone is "on hook", and power is supplied it is said to be in an idle state. This is determined by reading the signal provided by the hook switch sensor 30 from the I/O port 20. Upon receiving an indication that the telephone is in the idle state, the code implementing the idle algorithm is invoked.

Figure 14:
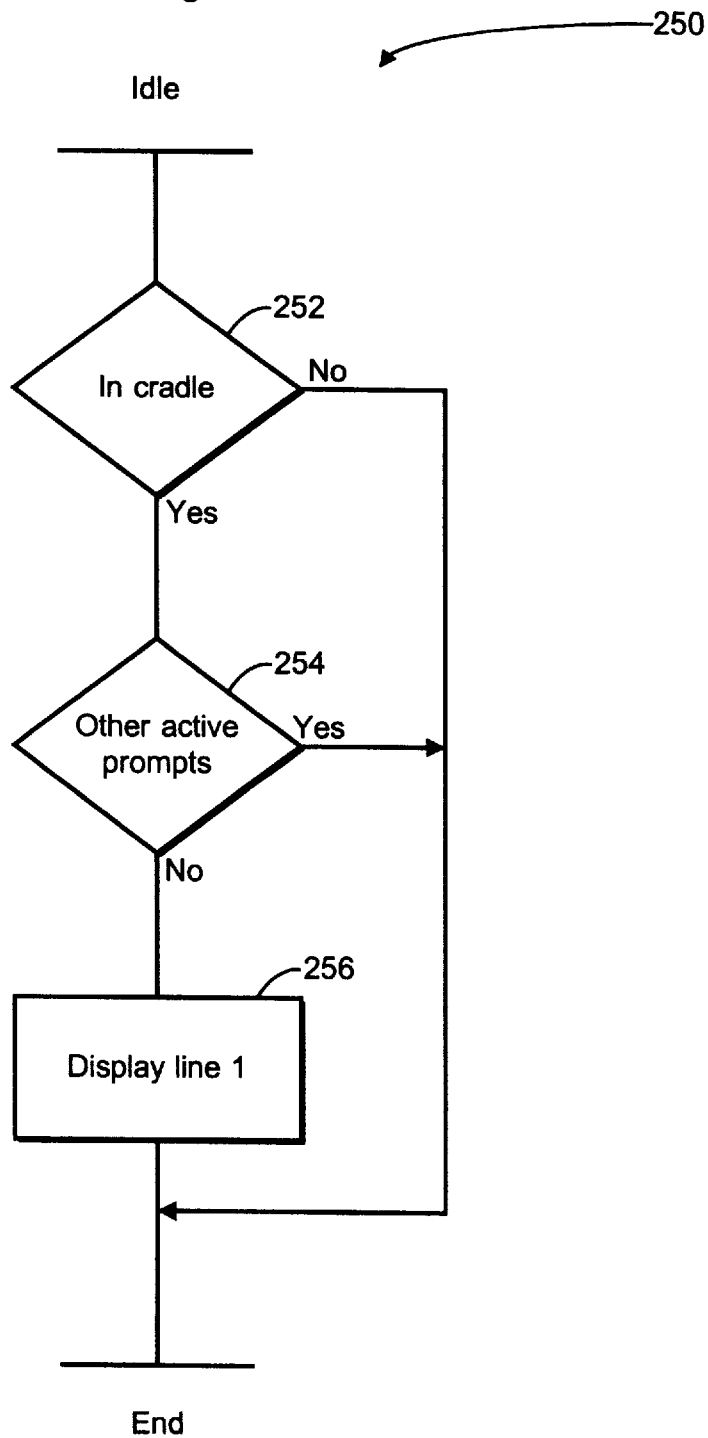
FIG. 14 is a flowchart representing an idle algorithm according to the first embodiment of the invention.

Referring to FIGS. 14 and 1, the idle algorithm is shown generally at 250 and includes a first block 252 which directs the microprocessor 12 to read the I/O port 20 to determine the status of the in-cradle sensor 36. If the in-cradle sensor 36 indicates that the handset is not in the cradle, the idle algorithm is ended. If, however, the handset is detected to be in the cradle, processing continues with block 254 which directs the microprocessor to determine whether or not other active prompts are pending. Various prompts displayable on the LCD, which may or may not be associated with aspects of this invention (eg. personal directory records) are store(d in a prompt buffer (not shown) together with an associated priority code field (not shown) comprised of two bytes. If the priority code field contains a non-zero value, the prompt is considered to be active. Thus, to determine whether or not there are any other active prompts, the microprocessor reads the priority code field associated with each prompt and if any contains a non-zero value the outcome of block 254 follows the "yes" path. Otherwise, there are no other active prompts pending and block 256 directs the microprocessor to locate line 2 of the power-up idle group, shown in FIGS. 6 and 7, and copy the phrase "Nortel Networks" to the display buffer for display on the LCD. The idle algorithm is thus completed. The microprocessor is thus programmed to direct the display to display an idle prompt in response to the idle signal.

Diagnostic Algorithm

FIG. 15

The ROM further includes a diagnostic mode message handling algorithm which allows the central office or a device in communication with the telephone through the central office to make requests to the telephone apparatus to read or write to any of the memory devices or devices having registers readable and writable by the microprocessor. This is useful for obtaining diagnostic information.

Figure 15:
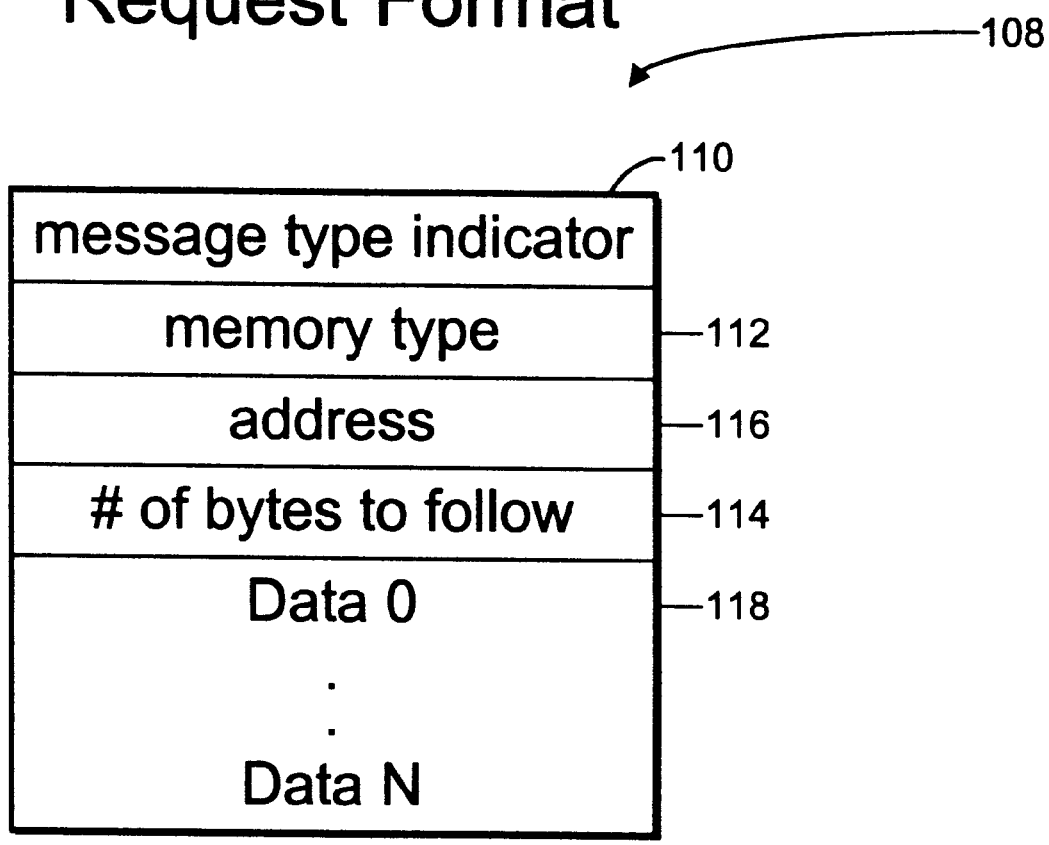
FIG. 15 is a representation of an incoming subscriber diagnostic message request format of messages received at the telephone from the central office, according to the first embodiment of the invention.

Referring to FIG. 15, read and write diagnostic messages are sent to the telephone in a diagnostic message format as shown at 108 in FIG. 15.

The diagnostic message format includes a message type indicator 110, a memory type indicator 112, an address value 114 and a number 116 indicating the number of bytes to follow in the message and a data portion 118. The message type indicator 110 indicates whether or not a read or write request is being made to the telephone. The message type indicator 110 is a byte indicating whether the message is associated with a read request or a write request. The memory type indicator 112 indicates the type of memory which is to be addressed by the message. The memory type may identify the RAM 14, the ROM 16, the EEPROM 18, the analogue to digital converter 38, or the combo chip 32 in communication with the microprocessor 12. The address value 114 refers to a base or starting address in the identified memory type and the number of bytes to follow 116 indicates the number of successive memory locations starting at the base or starting address, which are to be read or written.

FIG. 16

Figure 16:
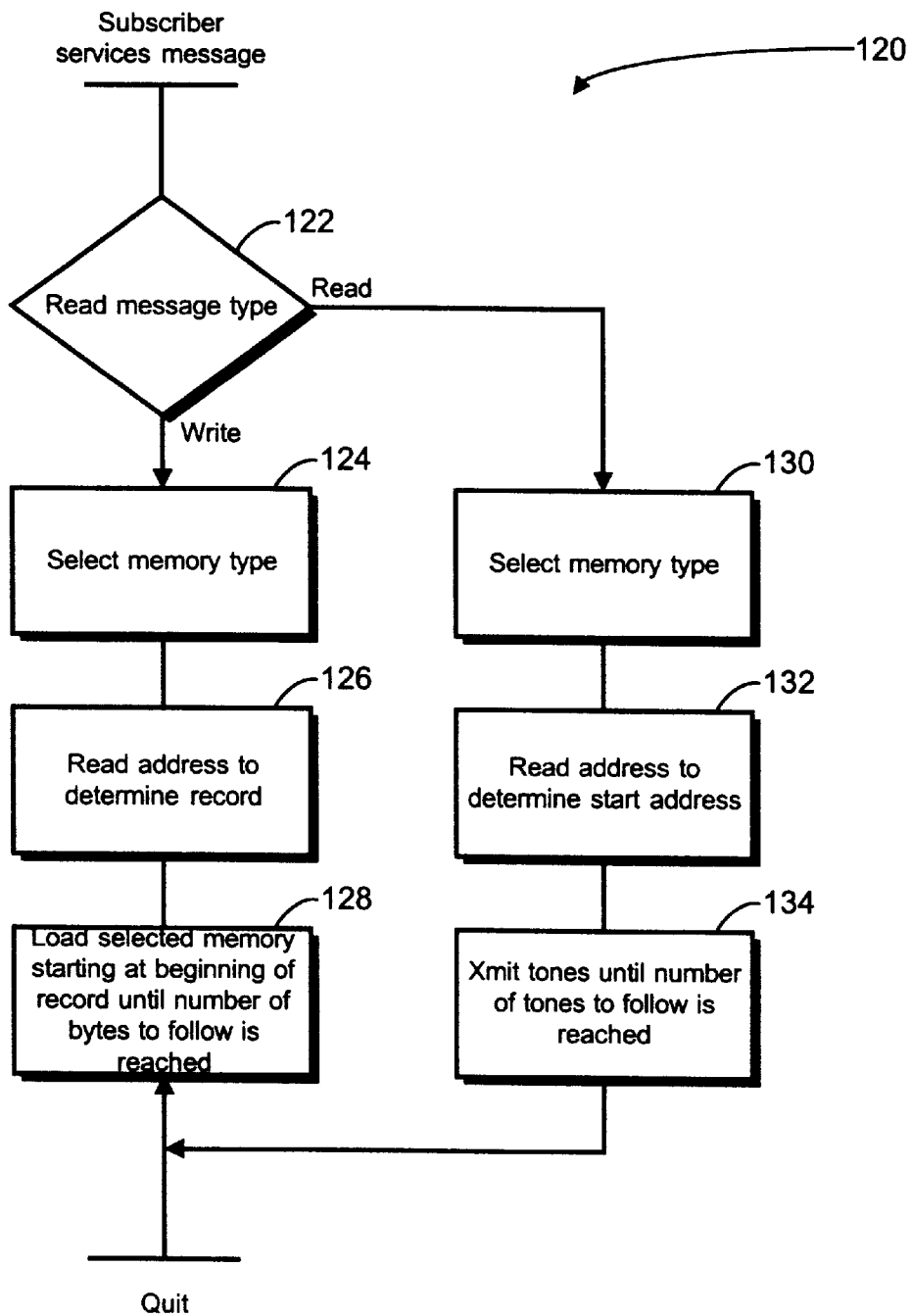
FIG. 16 is a flowchart describing a diagnostic mode message handling algorithm according to the first embodiment of the invention.

Referring to FIG. 16, the ROM 16 shown in FIG. 1 includes a code operable to direct the microprocessor to implement the diagnostic mode message handling algorithm shown generally at 120 in FIG. 16. Upon receipt of a diagnostic message at the FSK receiver 24, the microprocessor 12 is provided with an interrupt from the FSK receiver 24. The microprocessor 12 then executes the code implementing the diagnostic mode message handling algorithm which begins with block 122 which directs the microprocessor to read the memory type indicator 112 in the diagnostic message 108. If the message is a write message type, block 124 directs the microprocessor to read the memory type indicator 112 to determine which of the available devices is to be addressed. Block 126 then directs the microprocessor 12 to read the address value 114 of the diagnostic message 108 and to load the address value into a pointer register (not shown). Block 128 then directs the microprocessor 12 to write to the selected memory beginning at the address stored in the pointer register, with the bytes following in the data portion 118 of the message until the number of bytes written to memory equals the number of bytes to follow 116 in the message. The diagnostic mode message handling algorithm is then ended and the addressed memory device is Loaded with the data portion 118 of the subscriber services message 108.

Referring back to FIG. 16, in the event that the message received has a message type indicator 110 indicating the message is a read message, block 130 directs the microprocessor to read the memory type indicator 112 to determine which device is to be read and block 132 directs the microprocessor to read the address value 114 to determine the starting address at which to begin reading and block 134 directs the microprocessor to cause the transmitter 26 to transmit the contents of the selected memory beginning at the indicated starting address, the number of bytes requested in the number of bytes to follow portion 116.

FIG. 17

Figure 17:
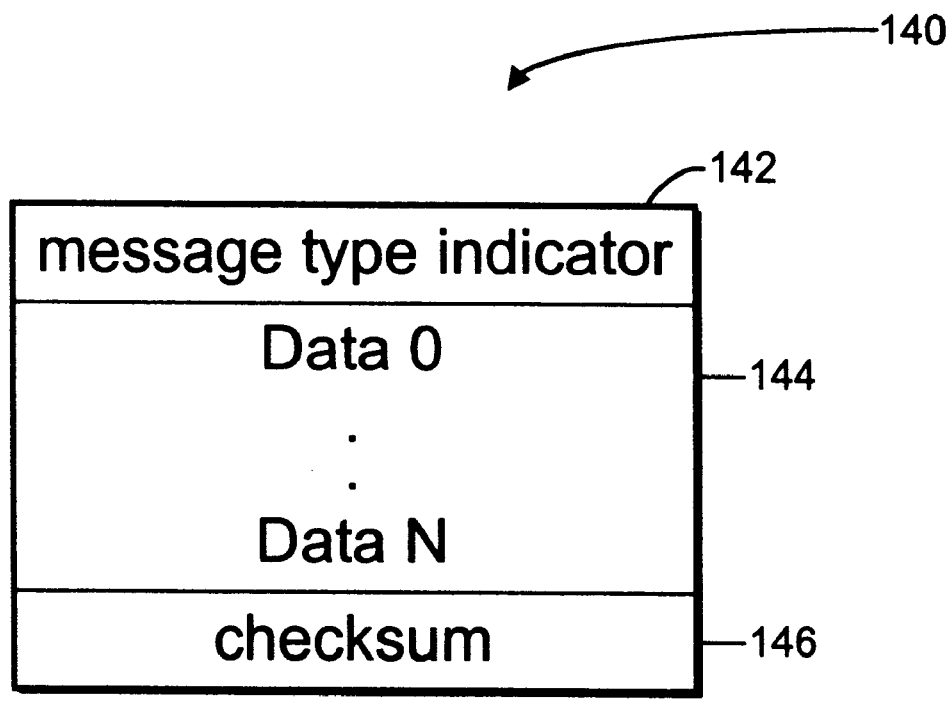
FIG. 17 is a representation of a message format of Dual Tone Multi Frequency (DTMF) messages transmitted from the telephone to the central office according to the first embodiment of the invention.

Referring to FIG. 17, when the incoming diagnostic message is a read-type message, the microprocessor 12 produces and formats an output message as shown at 140 in FIG. 17, and directs the transmitter 26 to send signals to the central office in the form of DTMF tones. The output message has a message type indicator 142, identifying the type of memory from which the data has been read, a data portion 144 including a number of bytes of data read from the indicated memory type and a checksum value 146 calculated on the basis of the foregoing message type and data, in the usual manner.

It will be appreciated that the central office may perform diagnostic inquiries on the telephone by specifying, for example, the EEPROM as the memory type in an incoming message and requesting to read the entire contents of the EEPROM. This would cause the telephone to send the entire contents of the EEPROM to the central office where these contents may be examined to determine or verify records pertaining to what services the subscriber has enabled. In addition, the microprocessor may be preprogrammed with diagnostic routines which can load an area of the RAM 14, such area being readable by the central office to ascertain the operational condition of the telephone.

FIG. 18

Password Protect Algorithm

In this embodiment the apparatus further includes a password protect feature which allows a user to specify a pre-defined sequence of keypad entries which will be recognized by the microprocessor such that it responds by preventing further keypresses to be indicated on the display but accumulated in a dial buffer (not shown). To effect this feature, personal directory records (not shown) stored in EEPROM, in addition to the records stored in the CCF group of records have associated with them a password protect bit which identifies whether or not the corresponding record is associated with the password protect feature.

Figure 18:
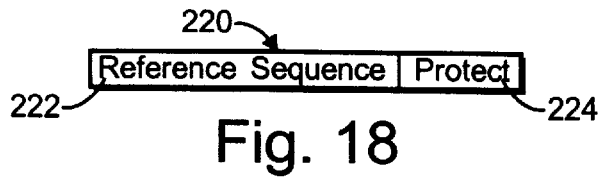
FIG. 18 is a general password protect buffer layout according to the first embodiment of the invention.

In addition, referring to FIG. 18, each record further includes a reference sequence field 222 and a password protect field 224. In the CCF group, the reference sequence field is the feature code field 78 shown in FIG. 4.

Generally, the reference sequence field 222 is operable to store a reference sequence of codes corresponding to a sequence of keystrokes pressed on the keypad 22 or associated with a CCF feature. The password protect field 224 is used to hold a single bit indicating whether or not the password protect feature should, in general, be used. For CCF records, the password protect field 224 is the password protect code field 86 shown in FIG. 4.

FIG. 19

Figure 19:
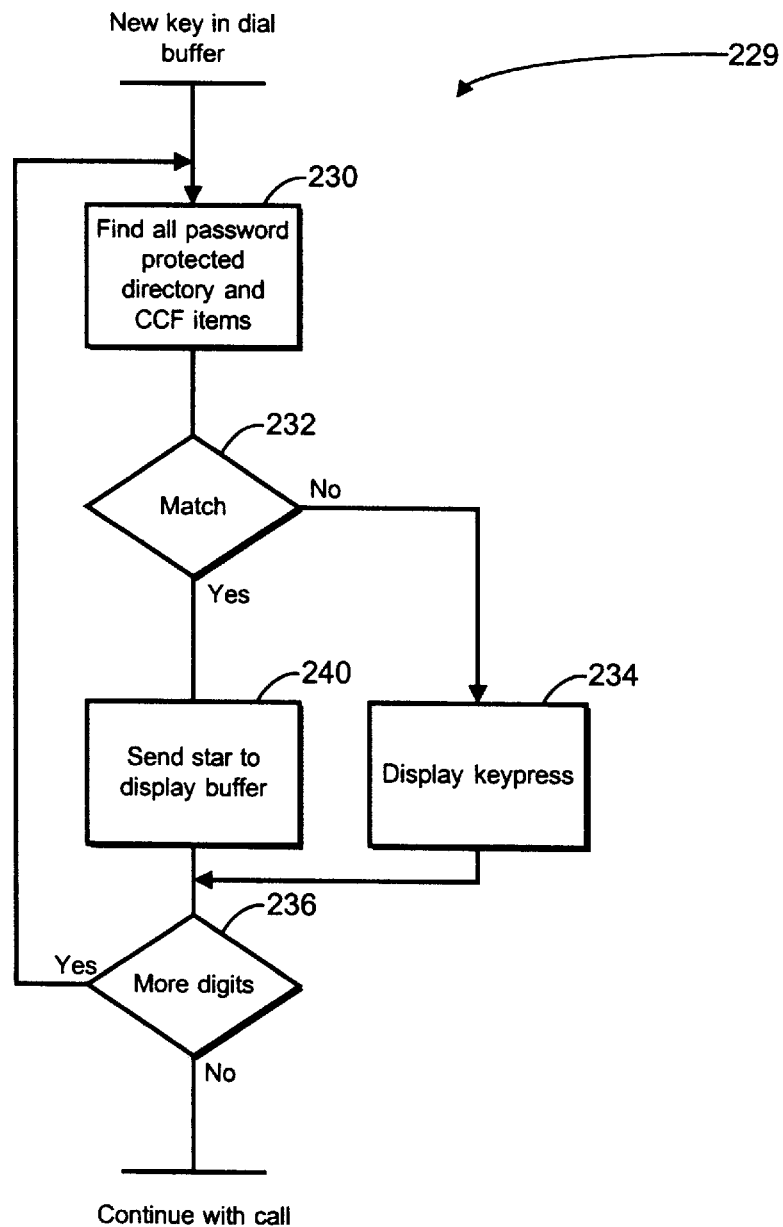
FIG. 19 is a flowchart representing a password protect algorithm according to the first embodiment of the invention.

Referring to FIG. 19, a password protect algorithm according to the first embodiment of the invention is shown generally at 229. This algorithm is run for each key press at the keypad. Upon entering a digit at the keypad, a code representing the digit is placed in the dial buffer and in a redial buffer (not shown). The dial buffer and redial buffer are accumulating-type buffers and therefore as the user enters a sequence of keypresses, existing codes in the dial buffer and redial buffer are shifted left while a code representing the current keypress is moved into a right most position in the buffer. The keypad thus acts as a user input device for producing the sequence of user input data in response to user input and the dial and redial buffers thus act as accumulators for accumulating a sequence of user input data as the sequence of user input data is entered by the user.

After each keypress, the password protect algorithm is run, in which a first block 230, directs the microprocessor to compare the contents of the dial buffer for equality with the contents of the reference sequence field 222 in all CCF records and personal directory records.

Block 232 then directs the microprocessor to determine whether or not there is a match and if there is no match, block 234 directs the microprocessor to cause an ASCII character corresponding to the code associated with the key depressed, to be sent to the display buffer for display. The microprocessor is thus programmed to direct the display to display the contents of the display buffer.

Block 236 then directs the microprocessor to wait for more digits to be selected at the keypad 22 and if no further digits are depressed, the password protect algorithm is ended and the microprocessor is directed to continue with the call.

If, however, a match is detected at block 232, block 240 directs the microprocessor to send the ASCII character for (*) to the display buffer and processing resumes at block 236 which directs the microprocessor to determine whether or not further digits are depressed. If further digits are depressed, the microprocessor is directed back to block 230 which again directs the microprocessor to check the dial buffer for a match with a reference sequence stored in any of the CCF records or personal directory records. In effect, therefore, the contents of the dial buffer are continually compared with the contents of the reference sequence fields 222 of all password protected records stored in EEPROM. Thus, the reference sequence fields of the CCF records and the personal directory records act as reference sequence buffers. It will be appreciated that microprocessor is operable to pre-program the reference sequence into the reference sequence buffers such as when creating CCF records in response to subscriber service messages or when creating personal directory records.

Upon finding an identical match of the contents of the dial buffer and the contents of a reference sequence field of a record with an active password protect bit, an identification of the key just pressed is not permitted to be sent to the display buffer or the redial buffer but rather a meaningless character such as a (*) is displayed instead.

Thus, the microprocessor is programmed to compare an initial portion of the user input sequence of data with a reference sequence. If the initial portion is not equal to the reference sequence, the microprocessor copies the initial portion to the display buffer and if the initial portion and the reference sequence are equal and a control code associated with the reference sequence is active, no subsequent portion of the input sequence is copied to the display buffer or the redial buffer and if the initial portion and the reference sequence are not equal or the control code associated with the reference sequence is not active, the subsequent portion of the sequence is copied to the display buffer and the contents of the display buffer are displayed.

While specific embodiments of the invention have been described and illustrated, such embodiments should be considered illustrative of the invention only and not as limiting the invention as construed in accordance with the accompanying claims.

What is claimed is:

1. A method of enabling features preprogrammed into a telephony device operable to communicate with a service provider, the method comprising:

a) receiving a subscriber services message at said telephony device, said subscriber services message including a feature controller;

b) enabling at least one feature preprogrammed into said telephony device in response to said feature controller.

2. A method as claimed in claim 1 wherein receiving includes receiving a feature identification code.

3. A method as claimed in claim 2 wherein receiving includes receiving a feature controller code.

4. A method as claimed in claim 1 further including receiving and storing a feature request code.

5. A method as claimed in claim 1 further including displaying a respective indication for each enabled feature at said telephone.

6. A method as claimed in claim 5 further including successively displaying a respective indication of each enabled feature.

7. A method as claimed in claim 6 wherein receiving includes receiving and storing a name of a feature to be enabled at said telephone.

8. A method as claimed in claim 7 further including displaying on said display respective names of enabled features.

9. A method as claimed in claim 8 further including successively displaying on said display respective names of enabled features.

10. A method as claimed in claim 1 further including associating with at least one enabled feature an indication of a related enabled feature.

11. A method as claimed in claim 10 further including displaying an indication of said related enabled feature after displaying an indication of said at least one feature.

12. A method as claimed in claim 1 wherein receiving includes receiving a list position code.

13. A method as claimed in claim 12 further including displaying indications of said enabled features in an order determined by said list position code.

14. A method as claimed in claim 1 further including receiving a customer premises equipment alerting signal prior to receiving said subscriber services message, and transmitting to said service provider a Dual Tone Multi-Frequency signal.

15. A method as claimed in claim 14 wherein said Dual Tone Multi-Frequency signal has a distinguishing component for distinguishing said Dual Tone Multi-Frequency signal from a conventional analog display services interface acknowledgement signal.

16. A method as claimed in claim 15 wherein said distinguishing component includes the character "D".

17. A method as claimed in claim 3 further including receiving from a user an indication of a selected feature.

18. A method as claimed in claim 17 further including:
a) responding to said indication of a selected feature, by locating in memory a feature identification code corresponding to said selected feature; and
b) transmitting a feature indicator to said service provider when a corresponding feature controller code is active, said feature indicator identifying to said service provider a request from said user for said selected feature.

19. A method as claimed in claim 18 further including rendering active a feature indicator associated with said selected feature.

20. A method as claimed in claim 19 further including copying said feature identification code and its associated feature controller code and its associated feature indicator to a feature buffer.

21. A method as claimed in claim 20 wherein receiving includes receiving and storing a feature name of a feature to be enabled at said telephone.

22. A method as claimed in claim 21 further including locating said feature name in memory and copying said feature name to said feature buffer.

23. A method as claimed in claim 20 further including associating with at least one of said enabled features an indication of a related enabled feature.

24. A method as claimed in claim 23 further including locating in memory said indication of a related enabled feature and copying said indication of a related enabled feature to said feature buffer.

25. A method as claimed in claim 24 wherein receiving includes receiving and storing said indication of a related enabled feature.

26. A method as claimed in claim 1 further including detecting when power is applied to said telephone after having no power supplied, and displaying at said telephone a power up prompt.

27. A method as claimed in claim 26 further including retrieving said power-up prompt from non-volatile memory.

28. A method as claimed in claim 1 further including detecting whether or not a handset of said telephone is connected to a base of said telephone and displaying an idle prompt when said handset is connected to said base.

29. A method as claimed in claim 28 wherein receiving includes receiving said idle prompt.

30. A method as claimed in claim 1 further including receiving and displaying a sequence of user input data to be transmitted from said telephone to said service provider.

31. A method as claimed in claim 30 further including protecting said sequence of user input data from display by:
a) comparing an initial portion of said sequence of user input data with a reference sequence;
b) if said initial portion is not equal to said reference sequence, copying said initial portion to a display buffer;
c) if said initial portion and said reference sequence are equal and a control code associated with said reference sequence is active, copying no subsequent portion of said sequence of user input data to said display buffer;
d) if said initial portion and said reference sequence are not equal or said control code associated with said reference sequence is not active, copying said subsequent portion to said display buffer; and
e) displaying the contents of said display buffer.

32. A method as claimed in claim 31 further including producing said sequence of user input data in response to user input.

33. A method as claimed in claim 31 further including pre-programming said reference sequence into a reference sequence buffer.

34. A method as claimed in claim 33 further including producing said sequence of user input data in response to user input.

35. A method as claimed in claim 34 further including accumulating said sequence of user input data as said sequence of user input data is entered by said user to produce said initial portion of said sequence of user input data.

36. A method as claimed in claim 31 further including storing said sequence of user input data in a redial buffer and if said initial portion and said reference sequence are equal and said control code associated with said reference sequence is active, copying no subsequent portion of said sequence of user input data to said redial buffer.

37. An apparatus for enabling features preprogrammed into a telephony device operable to communicate with a service provider, the apparatus comprising:
a) a receiver for receiving a subscriber services message at said telephony device, said subscriber services message including a feature controller;

b) a microprocessor for enabling use of at least one preprogrammed feature in said telephony device in response to said feature controller.

38. An apparatus as claimed in claim 37 wherein said receiver is operable to receive a feature identification code.

39. An apparatus as claimed in claim 38 wherein said receiver is operable to receive a feature controller code.

40. An apparatus as claimed in claim 39 wherein said receiver is operable to receive said feature controller code and wherein said memory is operable to store said feature controller code.

41. An apparatus as claimed in claim 37 wherein said display is operable to display a respective indication for each enabled feature at said telephone.

42. An apparatus as claimed in claim 41 wherein said display is operable to successively display a respective indication of each enabled feature.

43. An apparatus as claimed in claim 42 wherein said receiver is operable to receive a name of a feature to be enabled at said telephone and wherein said memory is operable to store said name of a feature.

44. An apparatus as claimed in claim 43 wherein said microprocessor is programmed to direct said display to display respective names of said enabled features.

45. An apparatus as claimed in claim 44 wherein said microprocessor is programmed to direct said display to successively display respective names of said enabled features.

46. An apparatus as claimed in claim 37 wherein said microprocessor is programmed to associate with at least one of said enabled features an indication of a related enabled feature.

47. An apparatus as claimed in claim 46 wherein said microprocessor is programmed to direct said display to display an indication of said related enabled feature after displaying said at least one of said enabled features.

48. An apparatus as claimed in claim 37 wherein said receiver is operable to receive a list position code.

49. An apparatus as claimed in claim 48 wherein said microprocessor is programmed to display indications of said enabled features in an order determined by said list position code.

50. An apparatus as claimed in claim 49 wherein said microprocessor is programmed to receive from a user an indication of a selected feature.

51. An apparatus as claimed in claim 50 further including a transmitter for transmitting to said service provider a feature indicator identifying to said service provider a request for said selected feature, and wherein said microprocessor is programmed to respond to said indication of a selected feature by locating a feature identification code corresponding to said selected feature and initiate transmitting when a corresponding feature controller code is active.

52. An apparatus as claimed in claim 51 wherein said microprocessor is programmed to direct said display to render active an indicator associated with said selected feature.

53. An apparatus as claimed in claim 52 wherein said receiver is operable to receive a feature name of a feature to be enabled at said telephone and wherein said microprocessor is programmed to store said feature name in memory.

54. An apparatus as claimed in claim 53 wherein said microprocessor is programmed to locate in memory said feature name and copy said feature name to a feature buffer.

55. An apparatus as claimed in claim 37 wherein said receiver is operable to receive an indication of a related enabled feature and further including a microprocessor programmed to store said indication of a related feature in memory.

56. An apparatus as claimed in claim 37 wherein said microprocessor is programmed to detect when power is applied to said telephone after having no power supplied, and to direct said display to display a power up prompt.

57. An apparatus as claimed in claim 56 further including non-volatile memory and wherein said microprocessor is programmed to retrieve said power-up prompt from said non-volatile memory.

58. An apparatus as claimed in claim 37 further including a detector for detecting whether or not a handset of said telephone is connected to a base of said telephone and if so, providing an idle signal to said microprocessor and wherein said microprocessor is programmed to direct said display to display an idle prompt in response to said idle signal.

59. An apparatus as claimed in claim 58 wherein said receiver is operable to receive said idle prompt and wherein said microprocessor is programmed to store said idle prompt.

60. An apparatus as claimed in claim 37 further including a user input device for receiving and displaying a sequence of user input data to be transmitted from said telephone to said service provider.

61. An apparatus as claimed in claim 60 further including a display buffer and wherein, said microprocessor is programmed to protect said sequence of user input data from display by:

a) comparing an initial portion of said sequence of user input data with a reference sequence b) if said initial portion is not equal to said reference sequence, copying said initial portion to said display buffer;

c) if said initial portion and said reference sequence are equal and a control code associated with said reference sequence is active, copying no subsequent portion of said sequence of user input data to said display buffer;

d) if said initial portion and said reference sequence are not equal or said control code associated with said reference sequence is not active, copying said subsequent portion to said display buffer; and e) directing said display to display the contents of said display buffer.

62. An apparatus as claimed in claim 61 wherein said user input device includes a keypad for producing said sequence of user input data in response to user input.

63. An apparatus as claimed in claim 61 further including a reference sequence buffer and wherein said microprocessor is programmed to pre-program said reference sequence into said reference sequence buffer.

64. An apparatus as claimed in claim 63 further including an accumulator for accumulating said sequence of user input data as said sequence of user input data is entered by said user to produce said initial portion of said sequence of user input data.

65. An apparatus as claimed in claim 61 further including a redial buffer operable to store said sequence of user input data and wherein said microprocessor is programmed to protect said sequence of user input data from display by, if said initial portion and said reference sequence are equal and said control code associated with said reference sequence is active, copying no subsequent portion of said sequence of user input data to said redial buffer.

66. An apparatus as claimed in claim 37 further including a transmitter for transmitting to said service provider a feature request code associated with a preprogrammed feature selected by a user of said telephone, said feature request code identifying to said service provider a request to provide services cooperating with the preprogrammed feature selected by said user.

67. A method of requesting features available from a service provider, in a telephone in communication with said service provider, the method comprising:
    a) receiving a subscriber services message at said telephone, said subscriber services message including:
        i) a feature identifier for identifying at least one of a plurality of features available in said telephone;
        ii) a feature controller for controlling whether or not said at least one feature is to be enabled at said telephone;
    b) displaying at said telephone a display message including an indication of features enabled at said telephone;
    c) transmitting to said service provider a feature indicator associated with an enabled feature selected by a user of said telephone, said feature indicator identifying to said service provider a request for said enabled feature selected by said user;
    d) receiving and displaying a sequence of user input data to be transmitted from said telephone to said service provider; and
    e) protecting said sequence of user input data from display by:
        i) comparing an initial portion of said sequence of user input data with a reference sequence;
        ii) if said initial portion is not equal to said reference sequence, copying said initial portion to a display buffer;
        iii) if said initial portion and said reference sequence are equal and a control code associated with said reference sequence is active, copying no subsequent portion of said sequence of user input data to said display buffer;
        iv) if said initial portion and said reference sequence are not equal or said control code associated with said reference sequence is not active, copying said subsequent portion to said display buffer; and
        v) displaying the contents of said display buffer.

68. A method as claimed in claim 67 further including producing said sequence of user input data in response to user input.

69. A method as claimed in claim 67 further including pre-programming said reference sequence into a reference sequence buffer.

70. A method as claimed in claim 69 further including producing said sequence of user input data in response to user input.

71. A method as claimed in claim 70 further including accumulating said sequence of user input data as said data is entered by said user to produce said initial portion of said sequence of data.

72. A method as claimed in claim 67 further including storing said sequence of user input data in a redial buffer and if said initial portion and said reference sequence are equal and said control code associated with said reference sequence is active, copying no subsequent portion of said sequence of user input data to said redial buffer.

73. An apparatus for requesting features available from a service provider, in a telephone in communication with said service provider, the apparatus comprising:
    a) a receiver for receiving a subscriber services message at said telephone, said subscriber services message including:
        i) a feature identifier for identifying at least one of a plurality of features available in said telephone;
        ii) a feature controller for controlling whether or not said at least one feature is to be enabled at said telephone;
    b) a display for displaying at said telephone a display message including an indication of features enabled at said telephone;
    c) a transmitter for transmitting to said service provider a feature indicator associated with an enabled feature selected by a user of said telephone, said feature indicator identifying to said service provider a request for said enabled feature selected by said user;
    d) a user input device for receiving and displaying a sequence of user input data to be transmitted from said telephone to said service provider; and
    e) a display buffer and microprocessor, said microprocessor being programmed to protect said sequence of user input data from display by:
        i) comparing an initial portion of said sequence of data with a reference sequence;
        ii) if said initial portion is not equal to said reference sequence, copying said initial portion to said display buffer;
        iii) if said initial portion and said reference sequence are equal and a control code associated with said reference sequence is active, copying no subsequent portion of said input sequence input sequence data to said display buffer;
        iv) if said initial portion and said reference sequence are not equal or said control code associated with said reference sequence is not active, copying said subsequent portion to said display buffer; and
        v) directing said display to display the contents of said display buffer.

74. An apparatus as claimed in claim 73 wherein said user input device includes a keypad for producing said sequence of user input data in response to user input.

75. An apparatus as claimed in claim 73 further including a reference sequence buffer and wherein said microprocessor is programmed to pre-program said reference sequence into said reference sequence buffer.

76. An apparatus as claimed in claim 75 further including an accumulator for accumulating said sequence of user input data as said sequence of user input data is entered by said user to produce said initial portion of said sequence of user input data.

77. An apparatus as claimed in claim 73 further including a redial buffer and wherein said microprocessor is programmed to store said sequence of user input data in said redial buffer and if said initial portion and said reference sequence are equal and said control code associated with said reference sequence is active, to copy no subsequent portion of said sequence of user input data to said redial buffer.

* * * * *

UNITED STATES PATENT AND TRADEMARK OFFICE
CERTIFICATE OF CORRECTION

PATENT NO.   : 6,061,439
DATED        : May 9, 2000
INVENTOR(S)  : Bleile et al.

It is certified that error appears in the above-identified patent and that said Letters Patent is hereby corrected as shown below:

Column 1,
Line 57, please delete "telephone" and insert -- telephones -- .

Column 6,
Line 35, please delete "3E" and insert -- 36 --.

Column 8,
Line 18, please delete "secc,nd/last" and insert -- second/last --.

Column 12,
Line 42, please delete "1!53" and insert -- 153 --.
Line 58, please "LCE)" and insert -- LCD --.

Column 24,
Claim 73, lines 33-34, please delete entirely and replace with -- portion of said input sequence to said display buffer --.

Signed and Sealed this

Thirty-first Day of July, 2001

*Attest:*

NICHOLAS P. GODICI
*Attesting Officer*   *Acting Director of the United States Patent and Trademark Office*